(12) United States Patent
Gallant et al.

(10) Patent No.: US 9,235,829 B2
(45) Date of Patent: *Jan. 12, 2016

(54) HIERARCHICAL PUBLISH/SUBSCRIBE SYSTEM

(75) Inventors: John K. Gallant, Sterling, VA (US); Karl M. Henderson, Dulles, VA (US); Brad Verd, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/534,732

(22) Filed: Jun. 27, 2012

(65) Prior Publication Data

US 2013/0024528 A1    Jan. 24, 2013

Related U.S. Application Data

(63) Continuation-in-part of application No. 12/610,066, filed on Oct. 30, 2009, and a continuation-in-part of application No. 12/615,205, filed on Nov. 9, 2009, now Pat. No. 8,982,882.

(51) Int. Cl.
*G06F 15/16* (2006.01)
*G06Q 10/10* (2012.01)
*H04L 29/08* (2006.01)
*H04L 12/18* (2006.01)

(52) U.S. Cl.
CPC .......... *G06Q 10/107* (2013.01); *H04L 12/1854* (2013.01); *H04L 67/327* (2013.01)

(58) Field of Classification Search
CPC .................................................. H04L 67/327
USPC ................................................. 709/206, 217
See application file for complete search history.

(56) References Cited

U.S. PATENT DOCUMENTS 6,202,093 B1 *  3/2001  Bolam et al. .................. 709/225
6,334,151 B1   12/2001  Bolam et al.
6,336,119 B1    1/2002  Banavar et al.
6,519,629 B2    2/2003  Harvey et al.

(Continued)

FOREIGN PATENT DOCUMENTS

WO    WO 2007/078283 A2    7/2007
WO       2011053847 A1    5/2011

OTHER PUBLICATIONS

Supplementary European Search Report dated May 6, 2013 from European Patent Application No. 10828717.8, 7 Pages.

(Continued)

*Primary Examiner* — Jeong S Park
(74) *Attorney, Agent, or Firm* — MH2 Technology Law Group, LLP

(57) ABSTRACT

A method for publishing a message includes receiving, at a first relay, a subscription request from a first client, wherein the subscription request includes a target. The method also includes: recording, at the first relay, subscription information of the first client based on the subscription request; receiving, at the first relay, a publication request from a second client, wherein the publication request includes a message string characterized by a pattern; determining, by the first relay, that the target matches at least a portion of the pattern; determining, by the first relay, if the publication request is a local publication request based on a predetermined policy rule; and transmitting the message string to the first client if the publication request is determined to be a local publication request.

20 Claims, 25 Drawing Sheets

(56) References Cited

U.S. PATENT DOCUMENTS

| | | |
|---|---|---|
| 6,578,066 B1 | 6/2003 | Logan et al. |
| 6,829,230 B1 | 12/2004 | Tiuri |
| 7,133,869 B2 | 11/2006 | Bryan et al. |
| 7,280,999 B2 | 10/2007 | Chung et al. |
| 7,310,686 B2 | 12/2007 | Uysal |
| 7,406,537 B2 | 7/2008 | Cullen |
| 7,546,368 B2 | 6/2009 | Drees et al. |
| 7,631,101 B2 | 12/2009 | Sullivan et al. |
| 7,685,270 B1 | 3/2010 | Vermeulen et al. |
| 7,694,016 B2 | 4/2010 | Halley |
| 7,725,602 B2 | 5/2010 | Liu et al. |
| 7,734,815 B2 | 6/2010 | Leighton et al. |
| 7,761,570 B1 | 7/2010 | Halley |
| 7,769,826 B2 | 8/2010 | Gustafsson |
| 7,814,202 B2 | 10/2010 | Drees et al. |
| 7,925,747 B2 | 4/2011 | Kirwan et al. |
| 7,925,782 B2 | 4/2011 | Sivasubramanian et al. |
| 7,930,393 B1 | 4/2011 | Baumback et al. |
| 7,933,951 B2 | 4/2011 | Sullivan et al. |
| 8,982,882 B2 | 3/2015 | Gallant et al. |
| 2002/0059379 A1 | 5/2002 | Harvey et al. |
| 2002/0129354 A1 | 9/2002 | Bryan et al. |
| 2003/0012215 A1 | 1/2003 | Novaes |
| 2003/0084057 A1 | 5/2003 | Balogh |
| 2003/0084074 A1 | 5/2003 | Balogh et al. |
| 2003/0084075 A1 | 5/2003 | Balogh et al. |
| 2003/0208539 A1 | 11/2003 | Gildenblat et al. |
| 2004/0039798 A1 | 2/2004 | Hotz et al. |
| 2004/0076155 A1* | 4/2004 | Yajnik et al. .................. 370/389 |
| 2004/0078450 A1 | 4/2004 | Chen et al. |
| 2004/0181588 A1 | 9/2004 | Wang et al. |
| 2004/0194102 A1 | 9/2004 | Neerdaels |
| 2004/0254926 A1 | 12/2004 | Balogh |
| 2005/0027882 A1 | 2/2005 | Sullivan et al. |
| 2005/0105513 A1 | 5/2005 | Sullivan et al. |
| 2005/0108257 A1* | 5/2005 | Ishii et al. ..................... 707/100 |
| 2006/0031432 A1 | 2/2006 | Patrick et al. |
| 2006/0059253 A1 | 3/2006 | Goodman et al. |
| 2006/0085507 A1 | 4/2006 | Zhao et al. |
| 2006/0167968 A1* | 7/2006 | Reynolds et al. ............. 709/202 |
| 2006/0235885 A1 | 10/2006 | Steele et al. |
| 2007/0061282 A1 | 3/2007 | Ganguly et al. |
| 2007/0070820 A1 | 3/2007 | Gallant |
| 2007/0088711 A1* | 4/2007 | Craggs ............................ 707/10 |
| 2007/0100808 A1 | 5/2007 | Balogh |
| 2007/0150596 A1* | 6/2007 | Miller et al. .................. 709/226 |
| 2007/0294419 A1 | 12/2007 | Ulevitch |
| 2008/0059152 A1 | 3/2008 | Fridman et al. |
| 2008/0071909 A1 | 3/2008 | Young et al. |
| 2008/0133646 A1 | 6/2008 | Azulai |
| 2008/0133729 A1 | 6/2008 | Fridman et al. |
| 2008/0155254 A1 | 6/2008 | Stradling |
| 2008/0201413 A1 | 8/2008 | Sullivan et al. |
| 2008/0256166 A1 | 10/2008 | Branson et al. |
| 2008/0256553 A1* | 10/2008 | Cullen .......................... 719/313 |
| 2008/0260119 A1 | 10/2008 | Marathe et al. |
| 2008/0307436 A1 | 12/2008 | Hamilton |
| 2009/0044246 A1* | 2/2009 | Sheehan et al. ............... 725/146 |
| 2009/0063664 A1 | 3/2009 | Tiberio, Jr. |
| 2009/0106211 A1 | 4/2009 | Balogh |
| 2009/0106390 A1 | 4/2009 | Kirwan, Jr. et al. |
| 2009/0138572 A1 | 5/2009 | Banks et al. |
| 2009/0157889 A1 | 6/2009 | Treuhaft |
| 2009/0235359 A1 | 9/2009 | Abdulhayoglu et al. |
| 2009/0282027 A1 | 11/2009 | Subotin et al. |
| 2009/0282028 A1 | 11/2009 | Subotin et al. |
| 2009/0282038 A1 | 11/2009 | Subotin et al. |
| 2010/0030897 A1 | 2/2010 | Stradling |
| 2010/0077462 A1 | 3/2010 | Joffe et al. |
| 2010/0082748 A1 | 4/2010 | Banks et al. |
| 2010/0138559 A1 | 6/2010 | Sullivan et al. |
| 2010/0218040 A1 | 8/2010 | Bodmer et al. |
| 2010/0257266 A1 | 10/2010 | Holmes et al. |
| 2010/0274836 A1 | 10/2010 | Orentas et al. |
| 2010/0274970 A1 | 10/2010 | Treuhaft et al. |
| 2010/0287532 A1 | 11/2010 | Smith et al. |
| 2010/0291950 A1 | 11/2010 | Lin et al. |
| 2010/0318858 A1 | 12/2010 | Essawi et al. |
| 2010/0333111 A1 | 12/2010 | Kothamasu et al. |
| 2011/0022678 A1 | 1/2011 | Smith et al. |
| 2011/0029662 A1 | 2/2011 | Drees et al. |
| 2011/0035469 A1 | 2/2011 | Smith et al. |
| 2011/0035497 A1 | 2/2011 | Daly et al. |
| 2011/0047292 A1 | 2/2011 | Gould et al. |
| 2011/0051728 A1 | 3/2011 | Bhogavilli et al. |
| 2011/0099232 A1* | 4/2011 | Gupta et al. .................. 709/206 |
| 2011/0106891 A1 | 5/2011 | Gallant et al. |
| 2011/0110267 A1* | 5/2011 | Gallant .......................... 370/254 |
| 2011/0161289 A1 | 6/2011 | Pei et al. |
| 2013/0024527 A1* | 1/2013 | Miller et al. .................. 709/206 |
| 2013/0024528 A1 | 1/2013 | Gallant et al. |
| 2013/0024529 A1 | 1/2013 | Gallant et al. |

OTHER PUBLICATIONS

Birman et al., "Exploiting virtual synchrony in distributed systems," ACM SIGOPS Operating Systems Review, Nov. 1987; 21(5):123-138.

International Search Report and Written Opinion of International Application No. PCT/US2010/049872, mailed Nov. 23, 2010, 9 pages total.

Extended European Search Report dated Oct. 14, 2013, European Application No. 13173260.4, filed Jun. 21, 2013, pp. 1-4.

European Search Report dated Oct. 17, 2013 from European Patent Application No. 13173251.3 filed Jun. 21, 2013, pp. 1-6.

Non-Final Office Action dated Jan. 3, 2014, for U.S. Appl. No. 13/534,634, filed Jun. 27, 2012, pp. 1-46.

International Search Report and Written Opinion from International Application No. PCT/US2010/054833 dated Dec. 23, 2010, 9 pages.

Extended European Search Report dated Jan. 23, 2014 from European Application No. 13173188.7, 11 pages.

Non-Final Office Action dated Apr. 24, 2014, issued in U.S. Appl. No. 13/534,786, filed Jun. 27, 2012, pp. 1-46.

Notice of Allowance and Fees Due dated Nov. 7, 2014, U.S. Appl. No. 12/615,205, filed Nov. 9, 2009, pp. 1-52.

Non-Final Office Action dated Aug. 27, 2014, U.S. Appl. No. 13/534,634, filed Jun. 27, 2012, pp. 1-41.

Final Office Action dated Jan. 27, 2015, U.S. Appl. No. 13/534,634, filed Jun. 27, 2012, pp. 1-21.

Jeong S. Park (Examiner), Final Office Action dated Sep. 1, 2015, U.S. Appl. No. 13/534,786, pp. 1-24.

Jeong S. Park (Examiner), Non-Final Office Action dated May 28, 2015, U.S. Appl. No. 13/534,634, pp. 1-29.

Wikipedia, "Publish/subscribe", Wikipedia entry retrieved from the internet Apr. 19, 2010, http://en.wikipedia.org/wiki/Publish/subscribe, pp. 1-4.

* cited by examiner

| Event | Remote/Mediation Relay | Central Relay |
|---|---|---|
| Receive a Subscribe | - Record Subscription<br>- Subscribe to each central relay in one set of central relays | Record Subscription |
| Receive a Publish from a remote client | - Forward Publish to one central relay in each set of central relays<br>- Publish to any directly connected client subscribers | |
| Receive a Publish from a remote relay | | Publish to remote/mediation relays that subscribed |
| Receive a Publish from a central relay | Publish to clients that subscribed | |

FIG. 14

HIERARCHICAL PUBLISH/SUBSCRIBE SYSTEM

REFERENCE TO RELATED APPLICATIONS

This application is a continuation-in-part of U.S. patent application Ser. No. 12/610,066, filed on Oct. 30, 2009, and U.S. patent application Ser. No. 12/615,205, filed on Nov. 9, 2009. The disclosures of U.S. patent application Ser. Nos. 12/610,066 and 12/615,205 are fully incorporated herein by reference.

TECHNICAL FIELD

The present disclosure relates generally to computer networks. More specifically, the present disclosure relates to methods for operation of a publish/subscribe system.

BACKGROUND

Publish and subscribe (publish/subscribe) systems are asynchronous messaging systems. Messages are categorized in classes and a subscriber expresses interest in one or more classes of messages to a server. The publisher of a message (publisher) does not send the message to a specific receiver (subscriber), but publishes the message to the server, without knowledge of what (if any) subscribers will receive the message. When a message is received for publication, the server transmits the message to subscribers who have expressed interest in the class associated with the message. Thus, the publishers and subscribers are decoupled in a publish/subscribe system, operating independently of each other.

The first publish/subscribe system was the "news" subsystem in the Isis Toolkit, which was described in a paper "Exploiting Virtual Synchrony in Distributed Systems" at the 1987 ACM Symposium on Operating Systems Principles conference (pp. 123-138).

As each user subscribes to various classes of messages, subscribers typically receive only a sub-set of the total messages published. As an example, a subscriber may subscribe to messages based on the topic of the message. Subscribers in a topic-based system will receive all messages published to the topics to which they subscribe. All subscribers to a topic receive the same messages. As another example, a subscriber may subscribe to messages based on the content of the message. In a content-based system, a message is only delivered to a subscriber if the attributes or contents of the message match constraints defined by the subscriber. Some publish/subscribe systems combine topics and contents in a hybrid manner.

In a typical publish/subscribe system, a server receives subscription requests from clients wishing to receive messages based on topic or content. When a user wants to publish a message, the message is sent to the server, which then forwards the message to the various users who have submitted subscription requests matching the message properties. In this way, the server performs a filtering function, only transmitting the message to interested subscribers. Some servers may perform a store-and-forward function during the process of routing messages from publishers to subscribers, decoupling the publishers and subscribers temporally. An example of this temporal decoupling is temporarily taking down a publisher in order to allow the subscriber to work through the backlog, producing a form of bandwidth throttling.

For relatively small installations, publish/subscribe systems, through parallel operation, message caching, and the like, can provide better scalability than a traditional client-server system. However, as a publish/subscribe system is scaled up, benefits provided by the publish/subscribe system are often lost. Thus, despite the functionality provided by conventional publish/subscribe systems, there is a need in the art for improved publish/subscribe systems as well as methods for using such systems.

SUMMARY

In one embodiment, there may be provided a method for publishing a message. The method includes: receiving, at a first relay, a subscription request from a first client, wherein the subscription request includes a target; recording, at the first relay, subscription information of the first client based on the subscription request; receiving, at the first relay, a publication request from a second client, wherein the publication request includes a message string characterized by a pattern; determining, by the first relay, that the target matches at least a portion of the pattern; determining, by the first relay, if the publication request is a local publication request based on a predetermined policy rule; and transmitting the message string to the first client if the publication request is determined to be a local publication request.

In another embodiment, there may be provided a first relay in a publish/subscribe message system. The first relay is configured to: receive a subscription request from a first client, wherein the subscription request includes a target; record subscription information of the first client based on the subscription request; receive a publication request from a second client, wherein the publication request includes a message string characterized by a pattern; determine that the target matches at least a portion of the pattern; determine if the publication request is a local publication request based on a predetermined policy rule; and transmit the message string to the first client if the publication request is determined to be a local publication request.

The preceding summary and the following detailed description are exemplary only and do not limit the scope of the claims.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings:

FIG. 14 is a chart illustrating message flow in a publish/subscribe system according to an embodiment of the present invention;

DESCRIPTION OF EXEMPLARY EMBODIMENTS

Figure 1A:
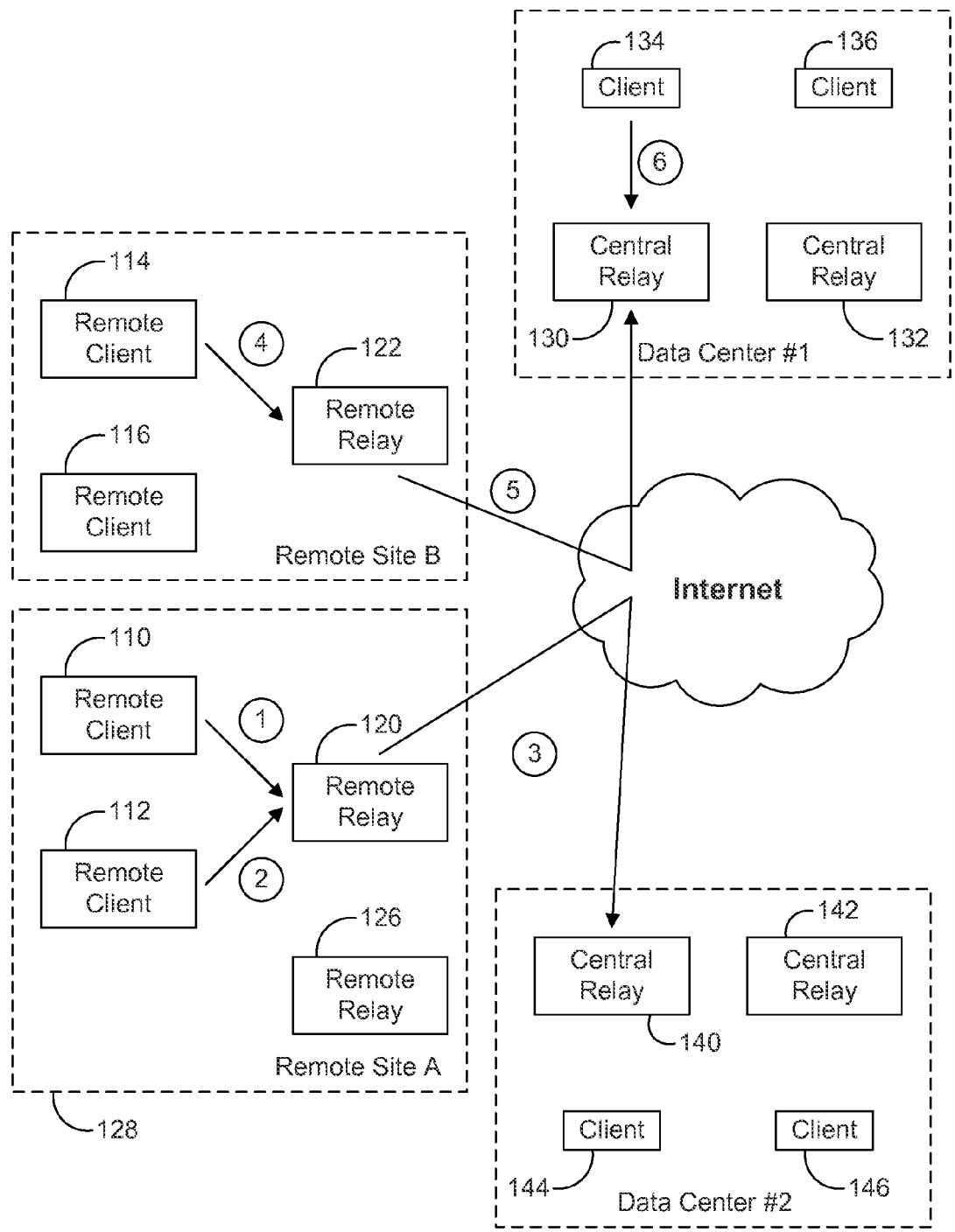
FIG. 1A is a simplified schematic diagram of remote sites and central data centers implementing a subscription request from multiple remote clients according to an embodiment of the present invention.

Reference will now be made in detail to exemplary embodiments, examples of which are illustrated in the accompanying drawings. When appropriate, the same reference numbers are used throughout the drawings to refer to the same or like parts.

As discussed above, typical publish/subscribe systems are one-level implementations in which a server interacts with subscribers and publishers. Each subscriber submits subscription requests to the server and each publication request is also submitted to the server. A drawback of using a conventional one-level system is that each client (either publisher or subscriber) is connected to the server, which results in a large number of connections between the clients and the server. The large number of connections, in turns, results in complexity in configuring, maintaining, and running the network on account of firewall rules, configuration of multiple logical paths, and the like.

Some embodiments of the present invention utilize a hierarchical structure that reduces the number of connections from clients to central sites, for example, by an order of magnitude. Reducing the number of connections reduces the complexity of the network and associated configuration, maintenance, etc. Additionally, reducing the number of connections between clients and central sites enhances security since fewer connections are established and the reduced number of connections can be more carefully tracked and controlled. Moreover, reducing the number of connections improves performance on both the servers and clients since the load on these systems associated with handling connection processing is reduced.

The Hydra Messaging Service (HMS) system operated by the present assignee is a publish/subscribe implementation used for message passing. The system can also be referred to as a message bus. Utilizing the HMS system, messages can be sent between edge sites (e.g., remote clients) and central sites (e.g., central data centers including central relays), for example, to transmit and receive monitoring data and commands. Messages can include statistics on the functioning of SDNS, WHOIS, TGV, CRL, or the like. These statistics can be provided to system operators in real time using a heads-up-display (HUD) or other suitable reporting system. For example, these statistics can be displayed in real time by Java HUD or Argus HUD, which may subscribe to HMS. Additionally, the messages can be stored and used for analysis and reporting of historical data related to system functionality and performance including, for example, Hydra database, Hydra Plots, and other users.

Some embodiments of the present invention utilize a hierarchical architecture for the publish/subscribe system. Although two levels of hierarchy are illustrated and discussed herein (i.e., remote relays and central relays), the present invention is not limited to two levels and the system can be extended to an arbitrary number of levels of hierarchy as appropriate to the particular application. The hierarchical publish/subscribe system described herein provides benefits not available using conventional techniques including redundancy, security, and performance.

In some embodiments, when a remote client wants to subscribe to a particular message group, a subscription request is transmitted from the remote client to a remote relay, which then passes the subscription request on to exactly one central relay. When the remote client wants to publish a message, it publishes to the remote relay, which then publishes the message (in the form of a publication request) to all central relays. The central relays then publish the message to the remote relays that have subscribed to the particular message group (typically using a lookup table stored by the central relay) and those remote relays, in turn, publish the message to the clients that have subscribed to the particular message group (also typically using a lookup table stored by the remote relay). The central relays can also publish the message to directly connected clients (e.g., central clients co-located with the central relay). The term directly connected includes clients that are not physically connected, but connected via a remote relay. Thus, the client may be geographically distant and the connection may traverse many routers/switches/networks. In references to co-located clients, the client may also be directly connected as described above. Each central relay stores a list of subscription requests that it has received from remote relays and central clients.

Table 1 illustrates exemplary processes performed in relation to subscription and publication requests received from clients, according to some embodiments of the present invention. For a remote relay, when a subscription request (subscribe) is received, the remote relay enters a subscription for the particular message type and then forwards the subscription request to a central server. The subscription request records the target and the reader. Forwarding of a subscription request includes the remote relay subscribing to a single central relay on behalf of the client that originated the subscription request. For a central relay, when a subscription request is received, the central relay enters a subscription, but does not need to forward the subscription request. In fact, by the remote relay only subscribing to a single central relay and the central relays not forwarding subscription requests, such embodiments of the present invention prevent duplicate or redundant subscriptions as well as duplicate or redundant publications.

TABLE 1

|  | Remote Relay | Central Relay |
| --- | --- | --- |
| Receive a Subscription Request | Subscribe + Forward-Subscribe | Subscribe |
| Receive a Publication Request from a Client | Forward-Publish | Forward-Publish + Publish |
| Receive a Publication Request from a Server | Publish | Publish |

Referring to Table 1, in relation to publication requests (publish), when a remote relay receives a publication request from a client, the remote relay forwards the publication request to all central relays contained in the list of central relays maintained by the remote relay. When a central relay receives a publication request from a client, it both publishes the publication message to all readers subscribed to the target and forwards the publication request to all the other central relays.

In Table 1, when a remote relay receives a publication request from a server, it will publish the publication request (or a portion of the publication request such as the publication message) to all readers subscribed to the target. Similarly, when a central relay receives a publication request from a server, it will publish the publication request (or a portion of the publication request such as the publication message) to all readers subscribed to the target.

FIG. 1A is a simplified schematic diagram of remote sites and central data centers implementing a subscription request from multiple remote clients according to an embodiment of the present invention. Client subscribers will send subscription messages indicating that these subscribers want to get all messages having certain characteristics. In conventional one-level systems, the client would send the subscription request to the server. Some embodiments of the present invention provide multiple levels of hierarchy in which a client may send the subscription request to either a central relay or a remote relay. Referring to FIG. 1A, remote client 110 sends a subscription request (1) to remote relay 120. Additionally, remote client 112 sends a subscription request (2) to remote relay 120. The subscription requests can be for the same type of message, that is, the subscription messages include a target that is shared by several subscription messages, or they could be for different messages. As an example, remote client 110 may be interested in messages "starting with x" and remote client 112 may be interested in messages "starting with y."

As an example, a DNS service running on a server may track the number of DNS translations in a given time period. This DNS translation rate can be published as a statistic that other clients may be interested in receiving. This DNS translation statistic could begin with a predetermined character or string, for example, "DNST." Subscription requests for this DNS translation statistic will therefore, include a condition that a string in the publication message will satisfy. For this example, the condition would be strings that start with "DNST." This condition can also be referred to as a target and the string in the publication message can be referred to as a pattern. For this example, the pattern could be DNST100, indicating 100 DNS translations in a second. When a relay receives this pattern or string in a list of statistics being distributed to the system, the target DNST will be compared against the pattern DNST100, and patterns that start with the target DNST will satisfy the defined condition. Accordingly, the relay will deliver this statistic to the clients that have subscribed to these DNS translation statistics. In some embodiments, a pattern may include regular expression. A regular expression is a software facility that describes a section of text. The text may be described by using a combination of literals (e.g., exact text characters) and metacharacters (e.g., a set of symbols and rules used to describe the text rather than the actual text). For example, a regular expression may utilize a file name wild card "*" to describe any text. In this case, to represent all files with, for example, "ABC" in the middle of a file name, one may use regular expression "*ABC*" in which symbol "*" is a metacharacter representing any text 0 or more times. In a publish/subscribe system, regular expressions can be used to, for example, subscribe to a particular set of information. For instance, the naming of servers may follow a certain convention, such as location-type-number. For example, a server in Maimi providing CNM service may be named mia-cnm-1 and a second of a pair may be named mia-cnm-2. If one wants to collect statistics from all cnm service machines, on matter where they are, on could subscribe to *cnm* to include all servers providing cnm service.

In another example, it may be desirable to send a command to a particular machine. In order to send this command, the machine could subscribe, providing its machine name to the remote relay. Another machine can then send a publication message including the machine name of interest. During the publication process, the desired machine will receive the message based on the machine name of interest. Another variation on this command mode is that a publication message could be sent to all machines using a wildcard. One of ordinary skill in the art would recognize many variations, modifications, and alternatives.

In some embodiments, a subscription message may have a condition, also referred to as a target, and a published message may be examined by the central relays and the remote relays to determine if the strings included in the published message have a pattern that satisfies the condition defined by the subscription message. As an example, the target could be a string of a first length (e.g., 4 characters) and the pattern could be a string of a second length (e.g., 10 characters) greater than the first length. The published messages are examined to determine if the targets of interest match portions of the patterns in the message. If the target matches a portion or the entire pattern, then the relay will direct the published message or some portion or variant thereof, to the other relays and clients that have subscribed using the target. The published message may be changed to another message as long as the clients that have subscribed using the target receive information indicating related to their subscription.

In some embodiments, remote relay 120 may maintain a database or other list of the subscription requests in order to provide messages having strings that match the conditions associated with the targets to the various clients that have subscribed to receive these messages.

In some embodiments, remote clients 110 and 112 and the remote relay 120 may be co-located at Remote Site A, with dashed line 128 representing a geographical boundary, that is, the geographical area associated with Remote Site A. It is also possible to have multiple levels of hierarchy without having multiple geographies. In the embodiment illustrated in FIG. 1A, two remote sites and two data centers, all at different geographical locations are illustrated, although this is merely an example and the present invention is not limited to this particular example. The present assignee maintains remote sites (also referred to as edge sites) located in many countries throughout the world. Additionally, the present assignee maintains data centers connected to these remote sites.

Referring to FIG. 1A, after remote relay 120 receives the subscription requests from remote clients 110 and 112, a single subscription request is transmitted (3) to a single central relay 140. In this example, the subscription requests specify the same message type, that is, they have the same target, but it will be appreciated that the subscription requests can be for different types of messages. Since, in this simplified example, the subscription requests from remote relays 110 and 112 are for the same message type, then remote relay 120 aggregates the multiple requests into a single subscription request, saving network bandwidth. Utilizing the database of subscription requests, both remote clients will receive the desired message when received by remote relay 120 as described more fully below. Depending on the characteristics of the subscription request, the subscription requests may not be aggregated. One of ordinary skill in the art would recognize many variations, modifications, and alternatives. In the embodiment shown in FIG. 1A, the subscription request from remote relay 120 is only sent to one central relay 140. If multiple subscription requests are subsequently received, they will also be sent to a single central relay, since each remote relay subscribes to one central relay at a time as described more fully throughout the present specification.

The hierarchical structure provided by some embodiments of the present invention reduces system complexity in comparison with conventional techniques in which the remote clients as well as clients located in a data center were attached into the data center directly. Each client would thus have a connection. Along with all these connections, there are attendant firewall rules, security holes, network traffic, and the like. As described above, by connecting through a remote relay, multiple identical subscription requests (received from multiple clients) are aggregated into a single subscription request transmitted from the remote relay to a single central relay. Thus, rather than multiple identical subscription requests from multiple clients, a single subscription request can be used, reducing system complexity.

In some embodiments, in order to eliminate redundant identical messages, each remote relay and each central client subscribes to only one central relay. Referring to FIG. 1A, remote relay 120 only transmits its subscription requests to central relay 140, which is located in Data Center #2. Each of the central relays will maintain a database or other list including information related to the subscription requests received by the particular central relay. By subscribing to a single central relay, when messages are published, each central relay will only publish the messages to remote relays and central clients that have subscribed to the particular message type. Because each remote relay only subscribes to one central relay, duplication of messages will not result, thereby providing each remote relay with only one copy of the messages of interest. In turn, the remote relays will pass on the messages of interest to the various remote clients that have subscribed to the particular remote relay. The particular central relay to which remote relays subscribe will be determined by system configuration and does not limit embodiments of the present invention.

As illustrated in FIG. 1A, connections are provided between the central relays and the remote relays. At the logical level, there is a network (e.g., the Internet) underlying the relays so that information from each of the relays, either remote or central, can be communicated to all of the other relays. Although some connections may be impacted by firewall rules and the like, conceptually, a network cloud provides connections between the various relays. In one implementation, the network cloud exists at the TCP/IP level. In another implementation, the network cloud exists as the UDP level. The present invention is not constrained by either of these particular implementations and other protocols can be utilized. In one implementation, connections at the bottom level of the TCP/IP stack are initiated from the central relays out to the remote relays for security reasons. The actual application level connection may be different than the lower level connection. In this implementation, a subscribe request is transmitted from the edge to the center (i.e., remote relay to central relay) but the lower level connection used to connect two TCP/IP endpoints is transmitted from the center to the edge.

Referring once again to FIG. 1A, remote client 114 transmits a subscription request (4) to remote relay 122, which in turn, transmits a subscription request (5) to a single central relay 130 located in Data Center #1. Additionally, central client 134 subscribes to certain message types by communicating a subscription request (6) to a single central relay 130. For purposes of clarity, only one subscription request is illustrated for each remote or central client and the present invention is not limited to a single such request. Multiple requests for different message types can be generated by the clients. One of ordinary skill in the art would recognize many variations, modifications, and alternatives.

Although remote client 110 and remote client 112 are connected to remote relay 120, the configuration data for these remote clients can include information related to remote relay 126, which can serve as a backup to remote relay 120. Redundancy is provided since if remote relay 120 goes down, clients 110 and 112 can initiate a connection to remote relay 126 in order to continue receiving service. The new connections to remote relay 126 can be created automatically or otherwise.

Figure 1B:
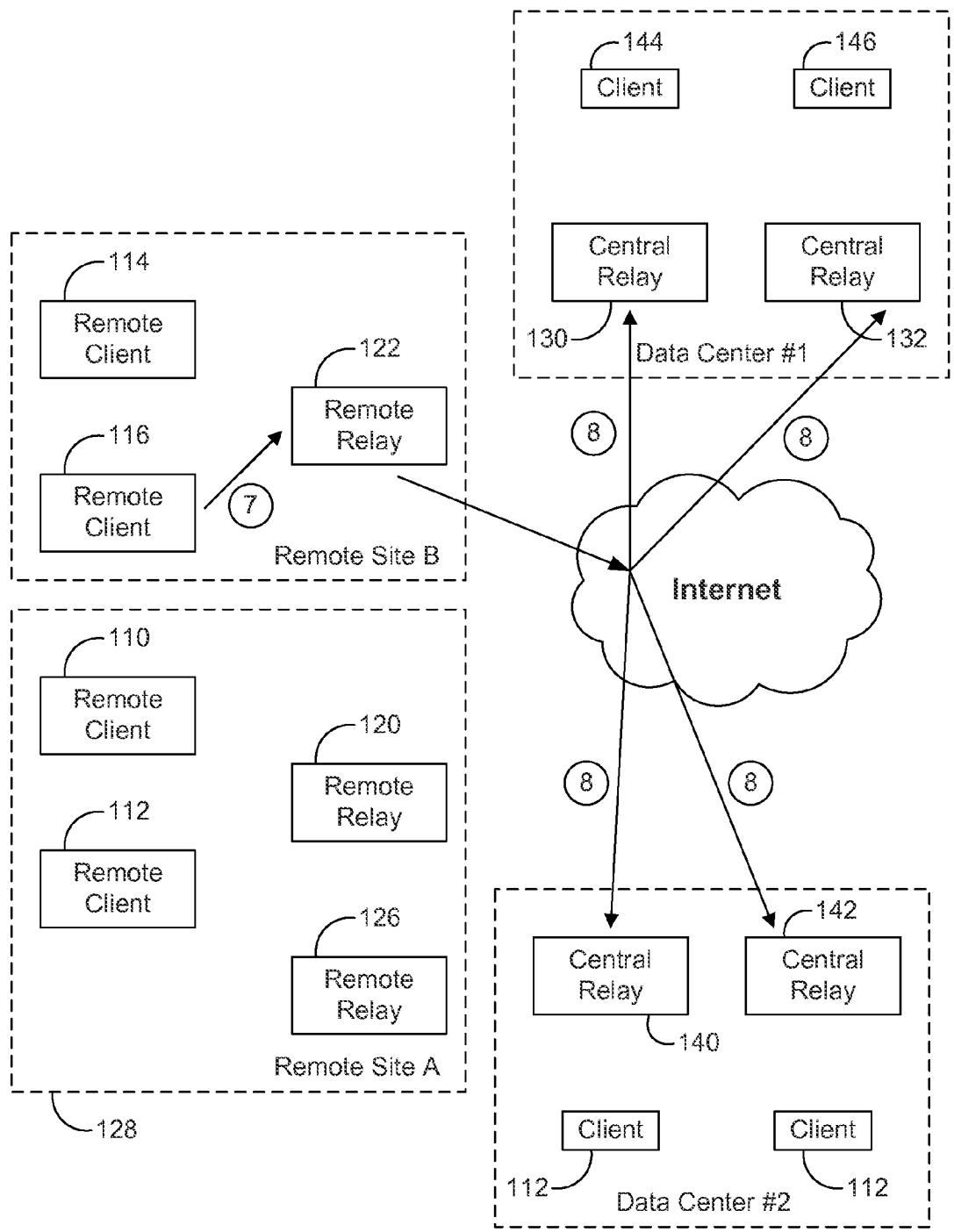
FIG. 1B is a simplified schematic diagram of remote sites and central data centers implementing a first stage of publication of a message from a remote client according to an embodiment of the present invention.

FIG. 1B is a simplified schematic diagram of remote sites and central data centers implementing a first stage of publication of a message from a remote client according to an embodiment of the present invention. Remote client 116 transmits a publication request (7) to remote relay 122. Both remote client 116 and remote relay 122 are co-located at remote site B. After receiving the publication request, which includes a message having a pattern, remote relay 122 transmits the publication request or a modified version of the publication request to all of the central relays: central relays 130 and 132 located in Data Center #1 and central relays 140 and 142 located in Data Center #2.

Some embodiments of the present invention provide redundancy because the remote relays subscribe to only one central relay at a time, but publish their messages to all of the central relays. As illustrated in FIG. 1B, when remote client 116 transmits a publication request including a message, the message is sent from remote relay 122 to all central relays 130, 132, 140, and 142. In some embodiments, the configuration of the remote relay includes information on all the central relays, enabling this "publish to all" behavior. In other embodiments, the central relays identify themselves during handshaking performed in the connection establishment phase. In some embodiments, the central relays do not publish subscription messages to each other, since, if a subscription request is received at a central relay, this can be sufficient to publish messages of interest to the central clients and remote relays serviced by the central relay.

In some embodiments, the implementation of "subscribe to one, publish to all" enables clients to reliably receive only one copy of each message meeting the client's subscription criteria. A client may not want to receive more than one copy of each message since this may result in duplicate messages. If, for example, the message contains a measurement, then the client would effectively end up double counting the measurement. Additionally, even though the remote relays transmit messages to multiple recipients in the form of central relays, there is confidence that the clients will only receive a single message, not duplicates based on their subscription to only one relay.

In the example shown in FIG. 1B, a single remote client publishes a message, but it will be understood that multiple remote clients can publish messages using the methods described herein.

Figure 1C:
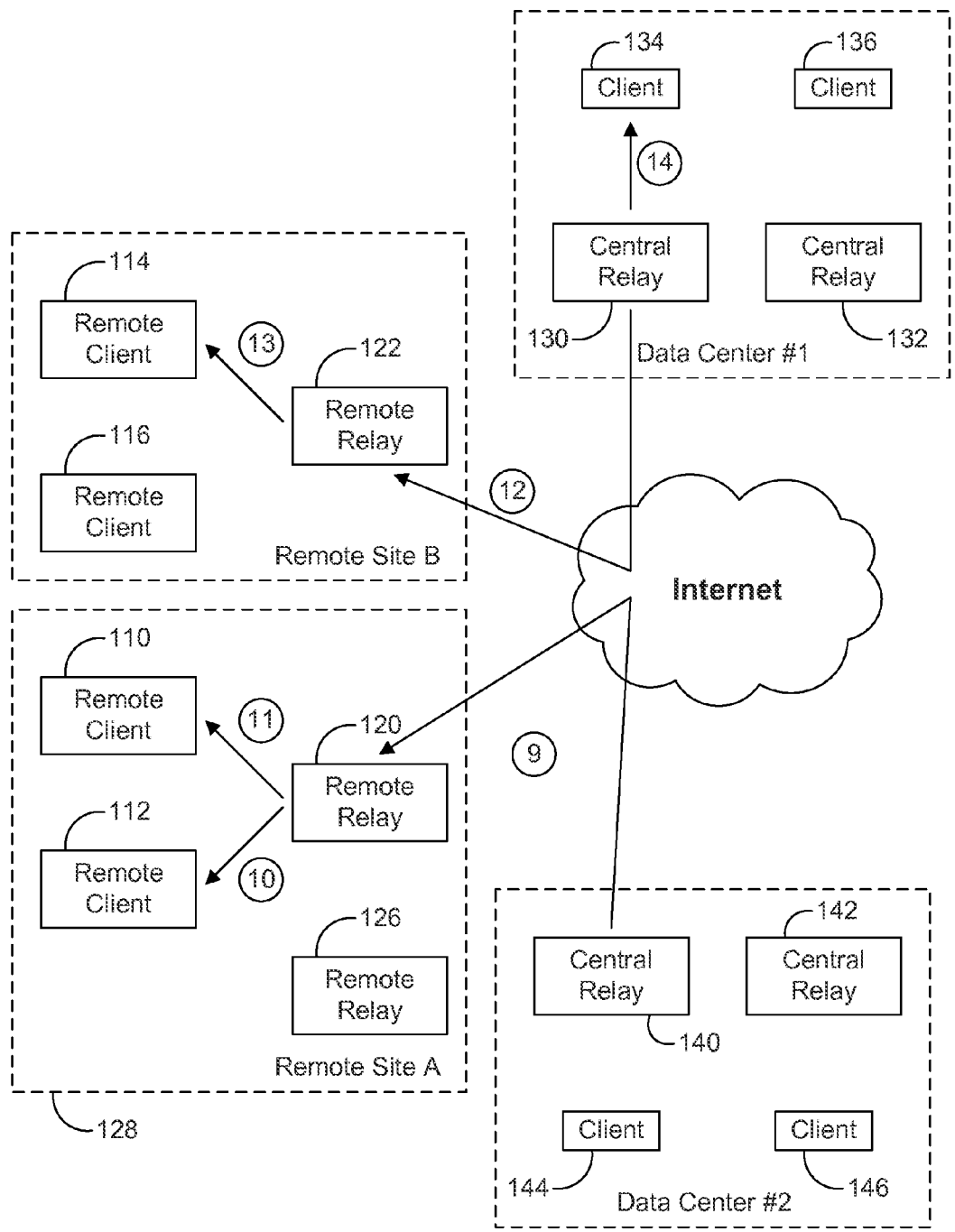
FIG. 1C is a simplified schematic diagram of remote sites and central data centers implementing a second stage of publication of a message from a remote client according to an embodiment of the present invention.

FIG. 1C is a simplified schematic diagram of remote sites and central data centers implementing a second stage of the publication of a message from a remote client according to an embodiment of the present invention. The central relays maintain a database including the types of messages that have been requested by the remote relays and centrally located clients. Since central relay 140 received subscription requests matching the message published by remote client 116, central relay 140 transmits the message to remote relay 120 (9). When the remote relay receives a message, it is able to forward the message on to clients interested in the particular message. The remote relays maintain a database of subscription requests that they have received from clients. Thus, the central relay does not necessarily know the identity of the various clients that will receive messages from the remote relays. Thus, remote relay 120 in turn, transmits the message to remote client 110 (10) and remote client 112 (11). Additionally, central relay 130 transmits the message to remote relay 122 (12), which transmits the message to remote client 114 (13). Central relay 130 also transmits the message to central client 134 (14). Thus, the three clients that subscribed to this message type receive the message when it is published.

Although only two data centers are illustrated, this is merely an example and additional data centers can be utilized. Similarly, the number of remote sites per data center may be more than one. Additionally, although only two levels of hierarchy are illustrated, additional levels could be utilized, with the most remote level connected to less remote levels, which are connected to the data centers. In other embodiments, there is a multiple remote relay hierarchy of the remote relays, each subordinate to a higher level remote relay in the system. Each of the remote relays will maintain a subscription list. In these systems with a multiple remote relay hierarchy, the term remote is relative since there will be a remote relay at the bottom of the system, with intermediate relays operating at higher levels of the hierarchy, and central relays at the top of the hierarchy. An architecture can be considered in terms of a remote relay at the city level, an intermediate relay at the county level, another intermediate relay at the state level, and the like, with the central relays at the highest level.

FIGS. 1A-1C illustrate clients that are able to both subscribe and publish. These clients can be remotely located (e.g., remote client 110) or co-located with the central relays in the data centers (e.g., central client 134). Typically, data (e.g., performance reporting, raw data packets that are sampled, authorization requests, and the like) constitutes the majority of traffic flowing from the remote sites to the data centers, while commands constitute the majority of the flow from the data centers to the remote sites. In other applications, the data and command flow may be varied. One of ordinary skill in the art would recognize many variations, modifications, and alternatives.

According to some embodiments of the present invention, if a subscription request and a publication request are routed to the same remote relay, the central relay that the remote relay is connected to can maintain a list of these subscription and publish requests so that the central relay does not have to receive the publication message from the remote relay and then send the same publication message back to the remote relay. Thus, in some embodiments, the handling of both requests can be performed at the remote relay to conserve system resources.

Figure 2A:
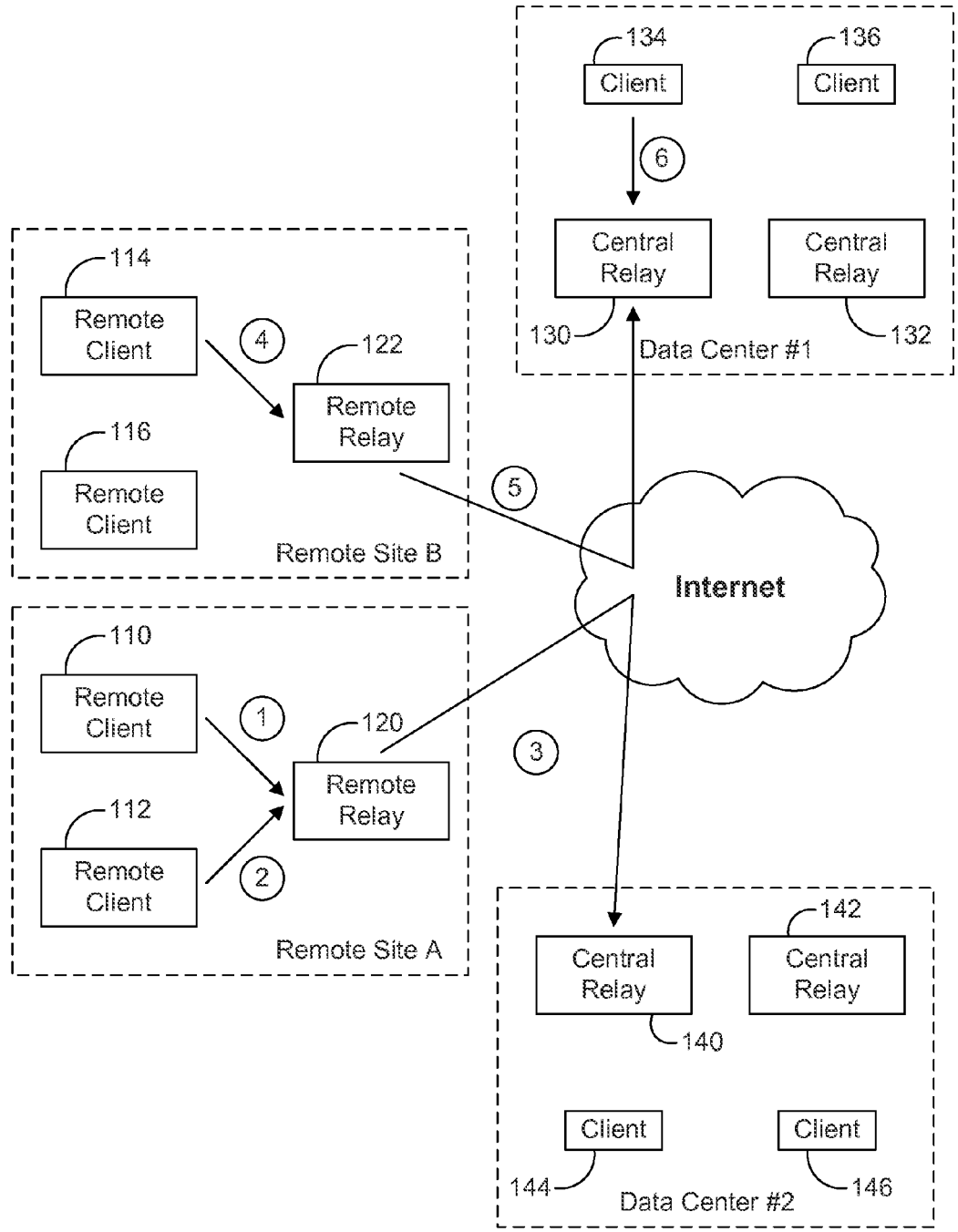
FIG. 2A is a simplified schematic diagram of remote sites and central data centers implementing a subscription request from multiple remote clients.

FIG. 2A is a simplified schematic diagram of remote sites and central data centers implementing a subscription request from multiple remote clients. In the embodiment illustrated in FIGS. 2A and 2B, remote clients submit subscription requests and a central client submits the publication request. Remote clients 110 and 112 submit subscription requests to remote relay 120 (1 and 2). These subscription requests are transmitted to a single central relay 140 (3). In addition to remote clients 110 and 112, subscription requests are submitted by remote client 114 (4) and central client 134 (6). Remote relay 122 transmits the subscription request from remote client 114 to central relay 130 (5), which also received the subscription request from central client 134.

Figure 2B:
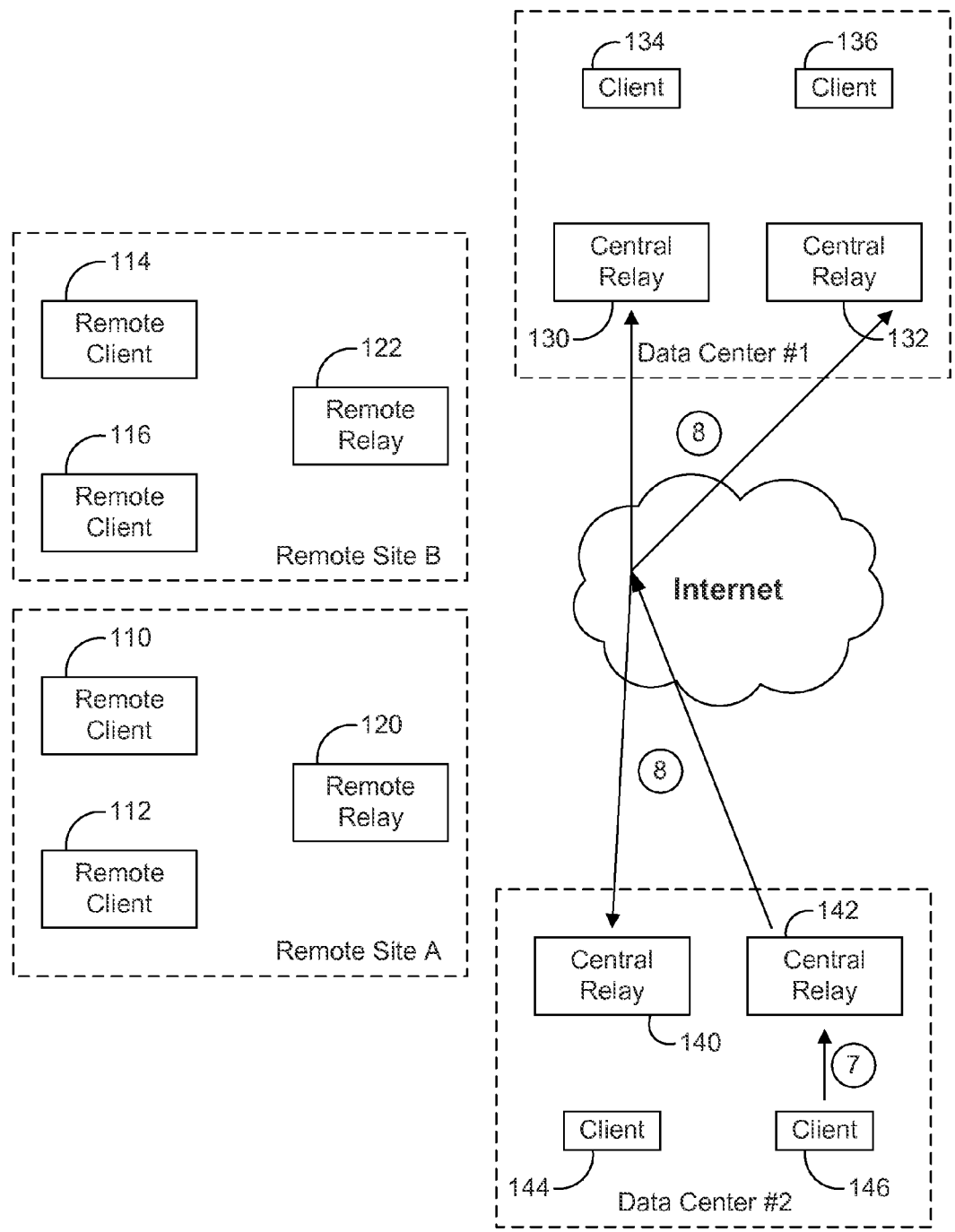
FIG. 2B is a simplified schematic diagram of remote sites and central data centers implementing a first stage of the publication of a message from a central client according to an embodiment of the present invention.

FIG. 2B is a simplified schematic diagram of remote sites and central data centers implementing a first stage of the publication of a message from a central client according to an embodiment of the present invention. The publication request is transmitted from central client 146 to central relay 142 (7). The central relay communicates the publication request to each of the other central relays (i.e., all central relays except for the central relay initially receiving the publication request). Thus, the publication request is transmitted to all the central relays (8) in accordance with the "subscribe to one, publish to all" technique provided by some embodiments of the present invention.

Figure 2C:
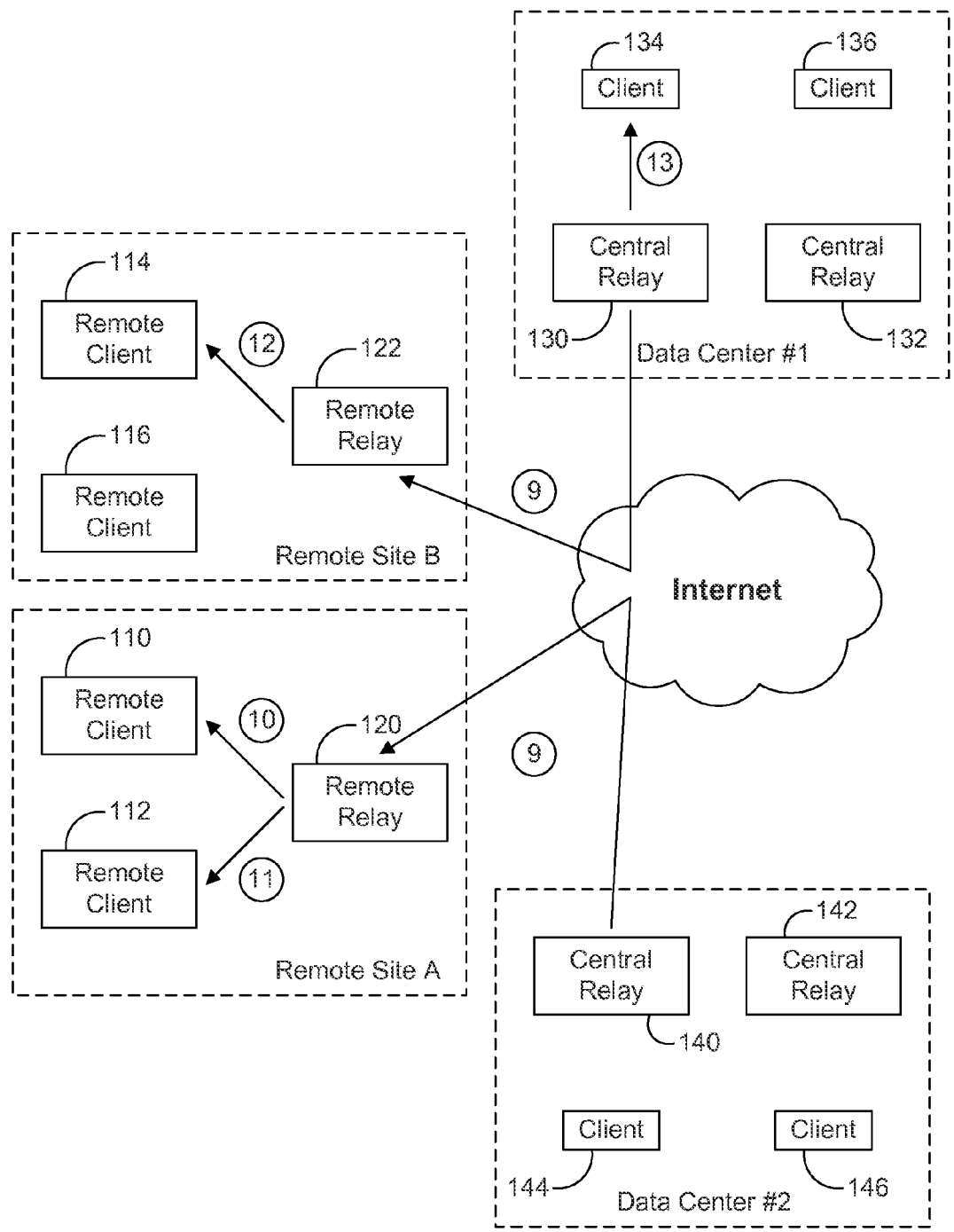
FIG. 2C is a simplified schematic diagram of remote sites and central data centers implementing a second stage of the publication of a message from a central client according to an embodiment of the present invention.

FIG. 2C is a simplified schematic diagram of remote sites and central data centers implementing a second stage of the publication of a message from a central client according to an embodiment of the present invention. Central relays 130 and 140, which had received subscription requests, publish the publication request to subscribing remote relays 102 and 122 (9). The remote relays in turn, publish the publication message to the remote clients that have submitted subscription requests. Thus, remote relay 120 publishes to remote clients 110 and 112 (10) and (11) since they have expressed interest in this message type and remote relay 122 publishes to remote client 114 (12). Central relay 130 also publishes the publication message to central client 134 (13). Thus, all subscribing clients receive the publication message sent from central client 146.

As described above, the hierarchy enables a reduction in the number of subscription requests transmitted to the central relays. In a similar manner, the hierarchy enables a reduction in the number of messages transmitted from the central relays. As an example, when client 146 transmits a message of interest to both remote clients 110 and 112, rather than two messages being sent from central relay 140, only a single message is transmitted from central relay 140 to remote relay 120. The reduction in message traffic from the central relays results in savings on transition costs, maintenance, security rules, CPU cycles, and the like.

It should be noted that an additional benefit provided by the hierarchical systems described herein is that remote relays can transmit an identical message to multiple central relays located at different data centers. Thus, the remote relay can duplicate messages and then send the duplicate messages to different data centers so that if one data center goes down, then the message is still received at the other data center, providing an additional level of system redundancy.

Some embodiments of the present invention provide a high level of flexibility for clients. A client can enroll in new subscriptions and provide new services easily. The decentralized system enables a client to indicate an interest in a particular class of messages without having to register at a central server.

Figure 3A:
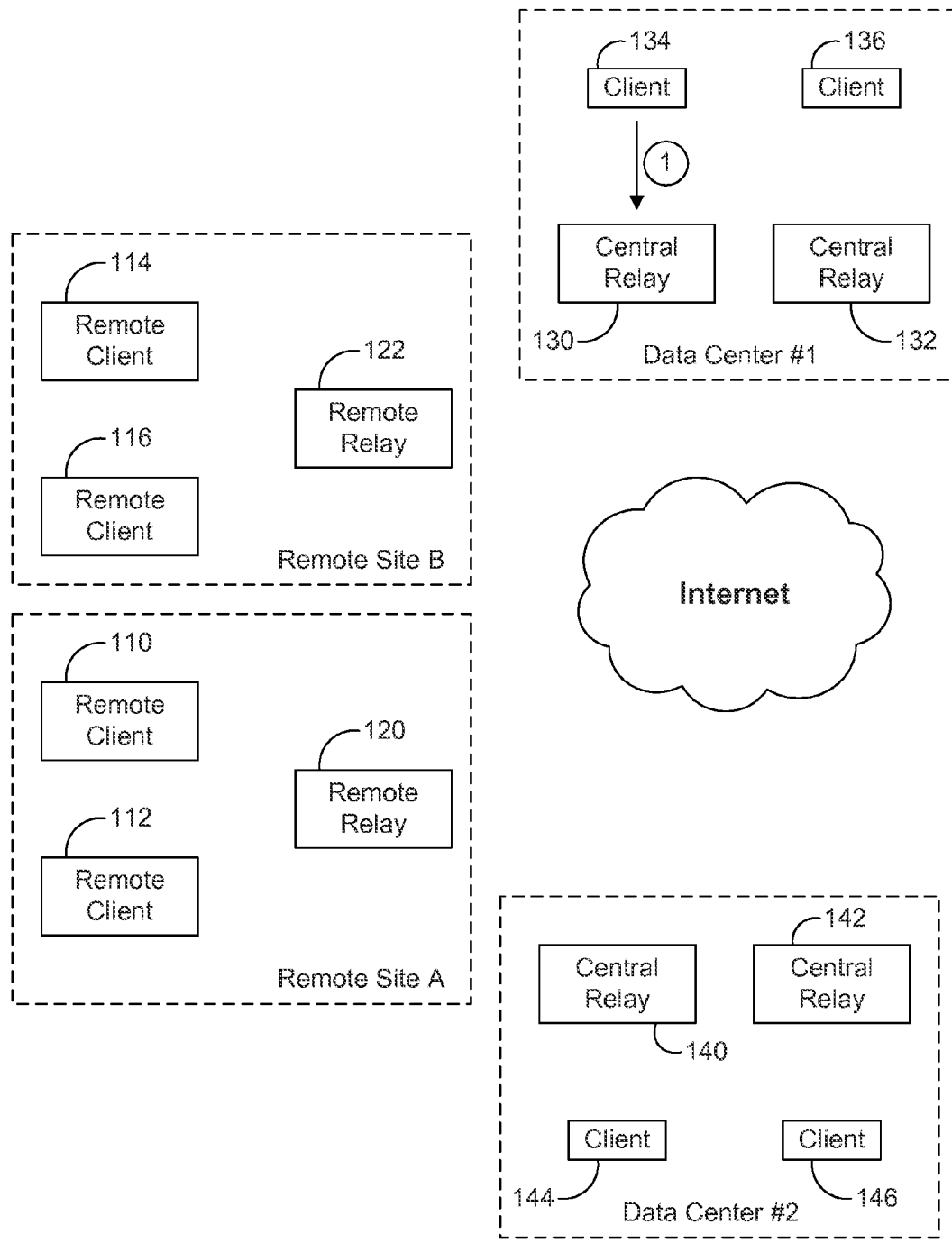
FIG. 3A is a simplified schematic diagram of remote sites and central data centers implementing a subscription request from a central client.

FIG. 3A is a simplified schematic diagram of remote sites and central data centers implementing a subscription request from a central client according to an embodiment of the present invention. In this embodiment, central client 134 submits a subscription request to central relay 130 indicating a type of message in which central client 134 is interested (1). The subscription request includes a target, which can also be referred to as an indicator of a message type. According to some embodiments of the present invention, once the subscription request is received at central relay 130, no additional action related to the subscription request is initially taken since the other central relays do not need to be informed of the subscription request.

Figure 3B:
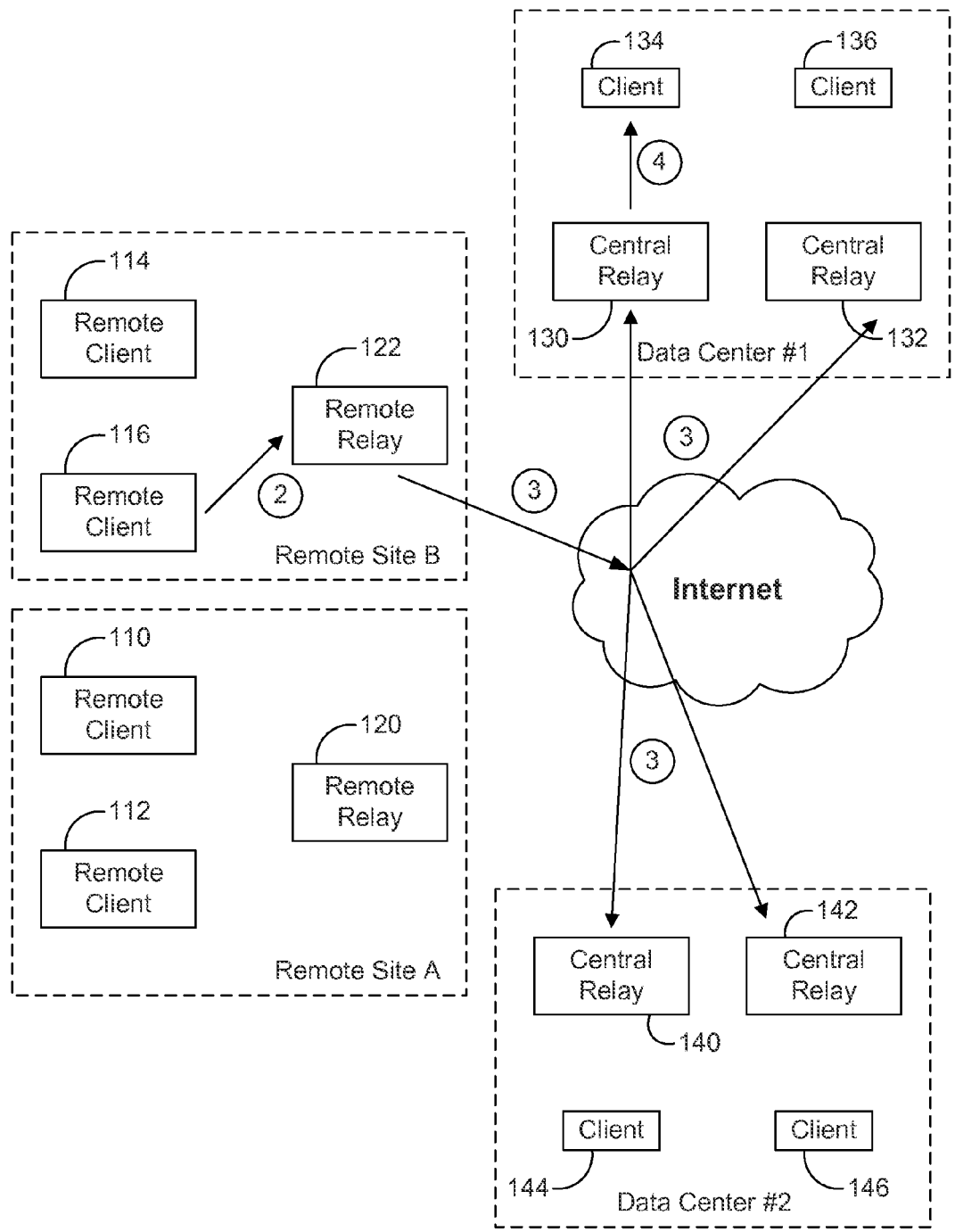
FIG. 3B is a simplified schematic diagram of remote sites and central data centers implementing publication of a message from a remote client.

FIG. 3B is a simplified schematic diagram of remote sites and central data centers implementing publication of a message from a remote client according to an embodiment of the present invention. Remote client 116 transmits a publication request (2) including a message that has a pattern, a portion of which matches the target indicated by central client 134 in its subscription request. The publication request, the message, or a variation of the publication request is transmitted by remote relay 122 to all the central relays (3). In turn, central relay 130, which maintains a database including the interest of central client 134 in messages of this particular type, transmits the message to central client 134 (4). Because, in this example, the other central relays have not received subscription requests, they take no action and the publication request is received without any resulting action by these central relays. In other words, since only central relay 130 has received a subscription request, it is the only relay that needs to publish the publication message.

Figure 4A:
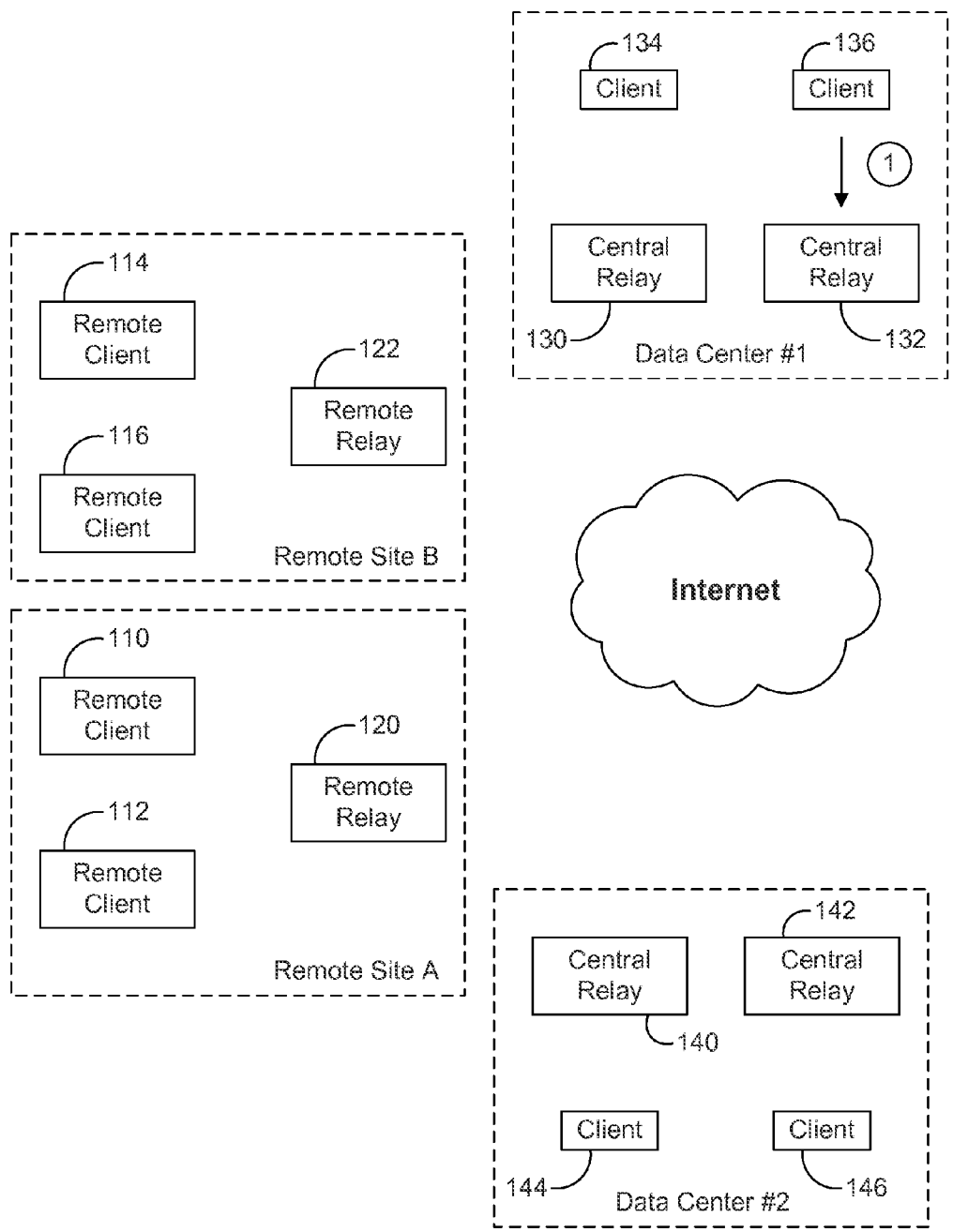
FIG. 4A is a simplified schematic diagram of remote sites and central data centers implementing a subscription request from a central client.

FIG. 4A is a simplified schematic diagram of remote sites and central data centers implementing a subscription request from a central client according to an embodiment of the present invention. Similar to the subscription request illustrated in FIG. 3A, a central client 136 submits a subscription request to a single central relay 132 (1).

Figure 4B:
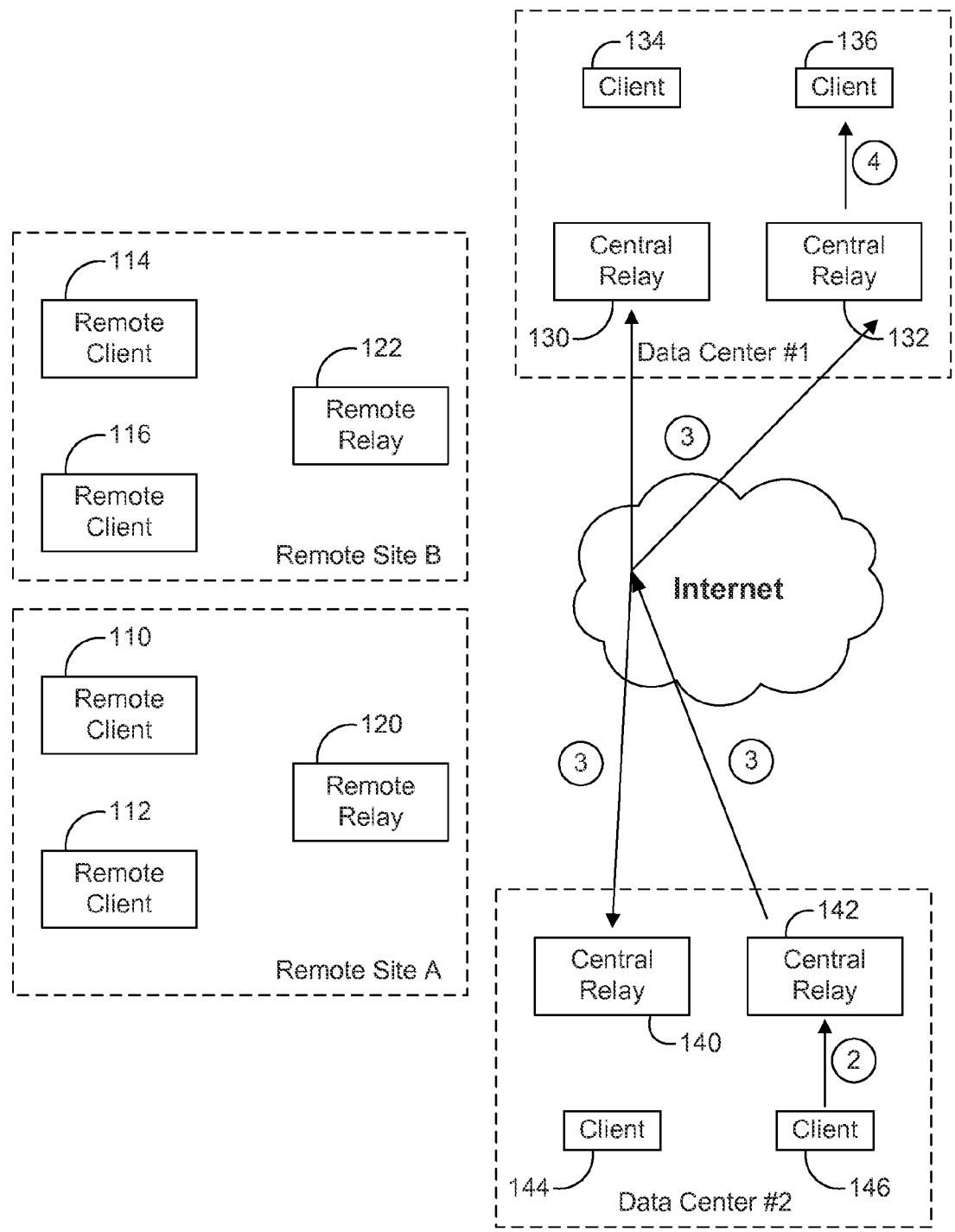
FIG. 4B is a simplified schematic diagram of remote sites and central data centers implementing publication of a message from a central client.

FIG. 4B is a simplified schematic diagram of remote sites and central data centers implementing publication of a message from a central client according to an embodiment of the present invention. Central client 146 transmits a publication request to central relay 142 (2), which then transmits the publication request to all the other central relays (3). Central relay 132 then transmits the message to client 136 (4), which had expressed interest in this particular message type. As discussed in relation to FIG. 3B, since only central relay 132 has received a publication request, it is on the only central relay to publish the message from client 146.

Figure 10A:
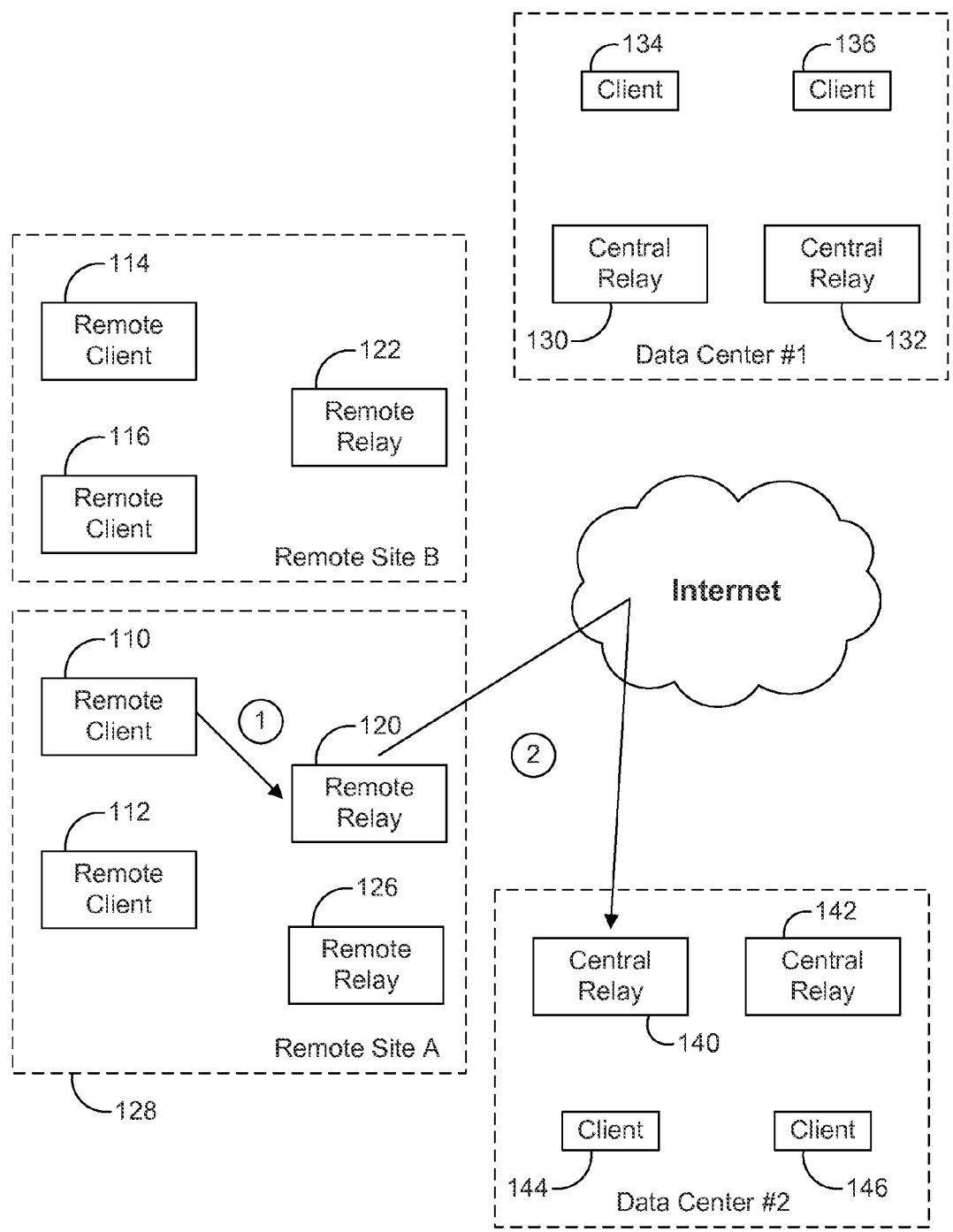
FIG. 10A is a simplified schematic diagram of remote sites and central data centers implementing a subscription request from a remote client according to an embodiment of the present invention.

FIG. 10A is a simplified schematic diagram of remote sites and central data centers implementing a subscription request from a remote client according to an embodiment of the present invention. Remote client 110 transmits a publication request to remote relay 120 (1), which, in turn, subscribes to a single central relay 140 (2).

Figure 10B:
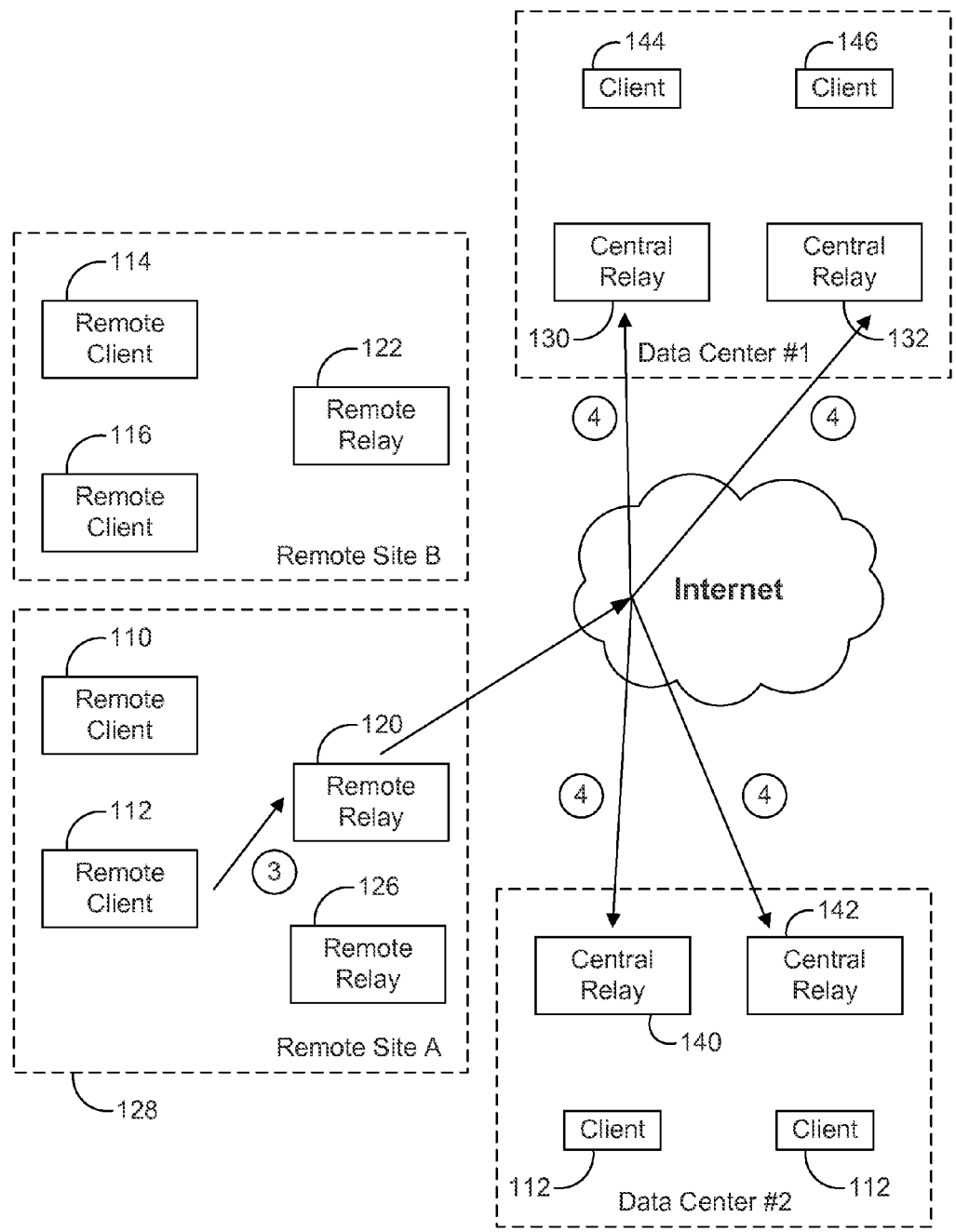
FIG. 10B is a simplified schematic diagram of remote sites and central data centers implementing a first stage of publication of a message from a remote client according to an embodiment of the present invention.

FIG. 10B is a simplified schematic diagram of remote sites and central data centers implementing a first stage of publication of a message from a remote client according to an embodiment of the present invention. Remote client 112 transmits a publication request or message to remote relay 120 (3), which publishes the publication message to all the central relays (4).

Figure 10C:
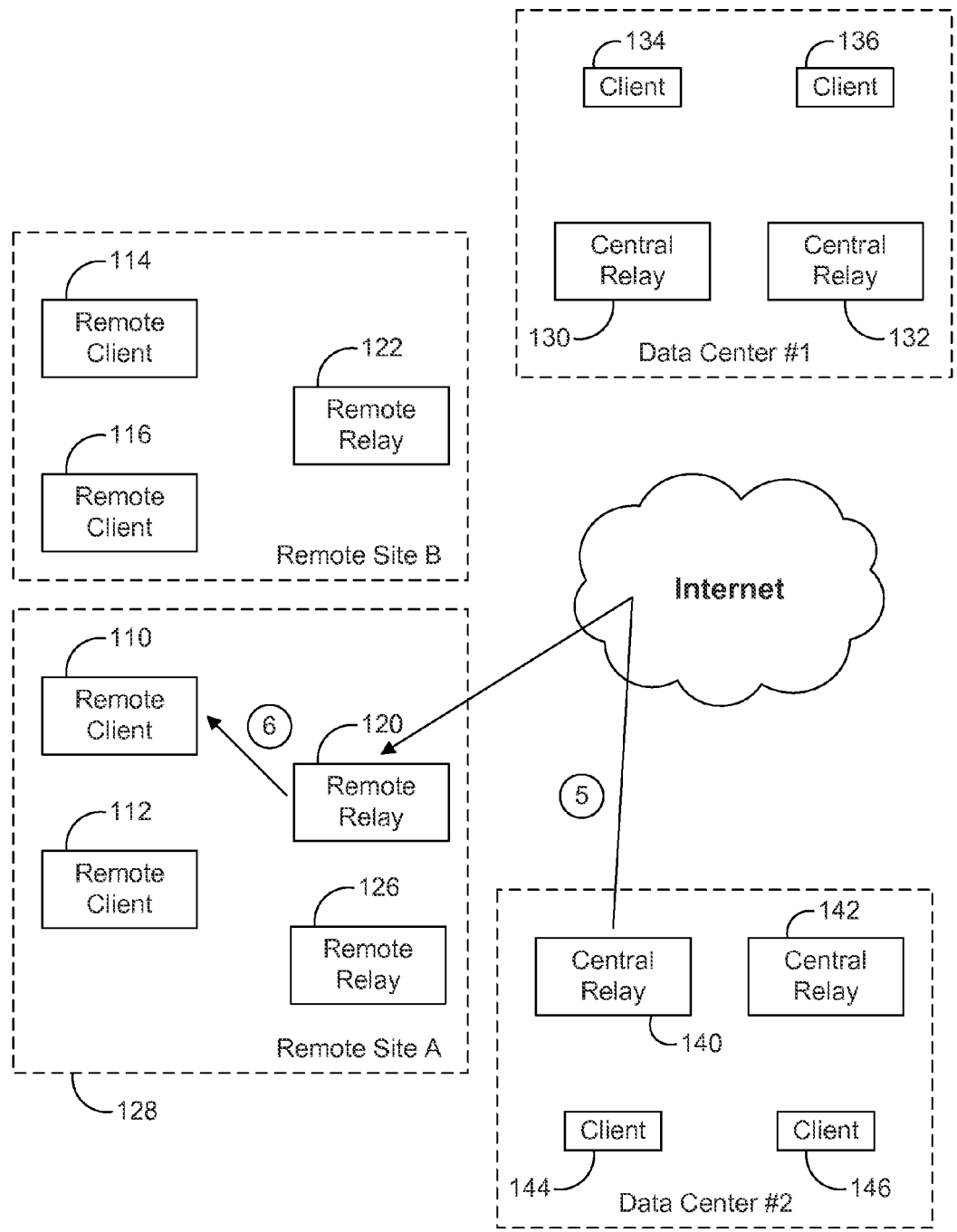
FIG. 10C is a simplified schematic diagram of remote sites and central data centers implementing a second stage of publication of a message from a remote client according to an embodiment of the present invention.

FIG. 10C is a simplified schematic diagram of remote sites and central data centers implementing a second stage of publication of a message from a remote client according to an embodiment of the present invention. After receiving the publication message, central relay 140 determines that it has received a subscription request for the publication message and transmits the publication message to remote relay 120 (5), which, in turn, passes the message on to remote client 110 (6).

In this example, although remote relay 120 receives both the subscription request and the publication request, messages are transmitted to the central relays as illustrated in FIG. 10B. The inventors have observed that in many implementations, the extra messages transmitted in FIG. 10B and FIG. 10C are outnumbered by the reduction in the number of redundant subscriptions and the corresponding gains in system performance.

Figure 5:
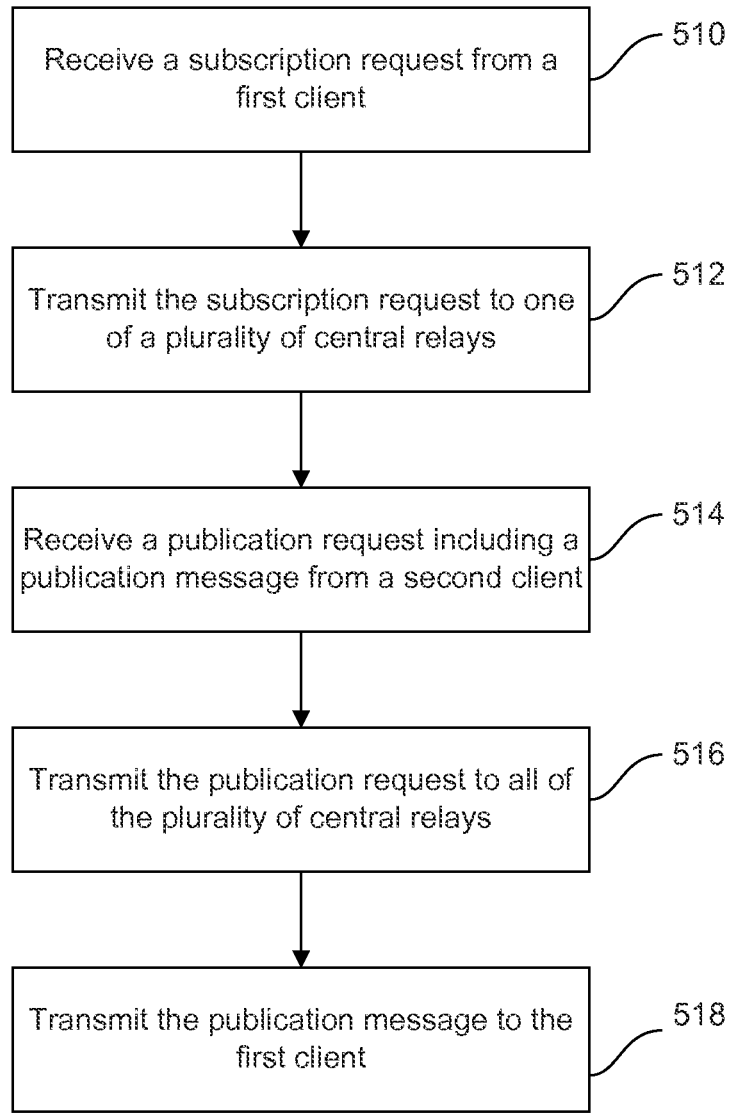
FIG. 5 is a simplified flowchart illustrating a method of subscribing from a remote client and publishing from a remote client according to an embodiment of the present invention.

FIG. 5 is a simplified flowchart illustrating a method of subscribing from a remote client and publishing from a remote client according to an embodiment of the present invention. The method includes receiving a subscription request from a first client (510). The subscription request is received at a remote relay and includes a target that will match a portion of a pattern in a message that the first client is interested in receiving. The method also includes transmitting the subscription request to one of a plurality of central relays (512). According to some embodiments of the present invention, the subscription request is transmitted from the remote relay to a single central relay using a "subscribe to one, publish to all" technique described above.

In step 514, a publication request, also referred to as a publish request, is received from a second client. The publication request is received at a remote relay and includes a message with a pattern matching, in part or in whole, the target that is found in the subscription request. The message can be referred to as a publication message. This is a message that the first client is interested in receiving. The publication request is transmitted to all of the central relays (516). In turn, the remote relay that received the subscription request from the first client, transmits the publication message to the first client (518).

It should be appreciated that the specific steps illustrated in FIG. 5 provide a particular method of subscribing from a remote client and publishing from a remote client according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
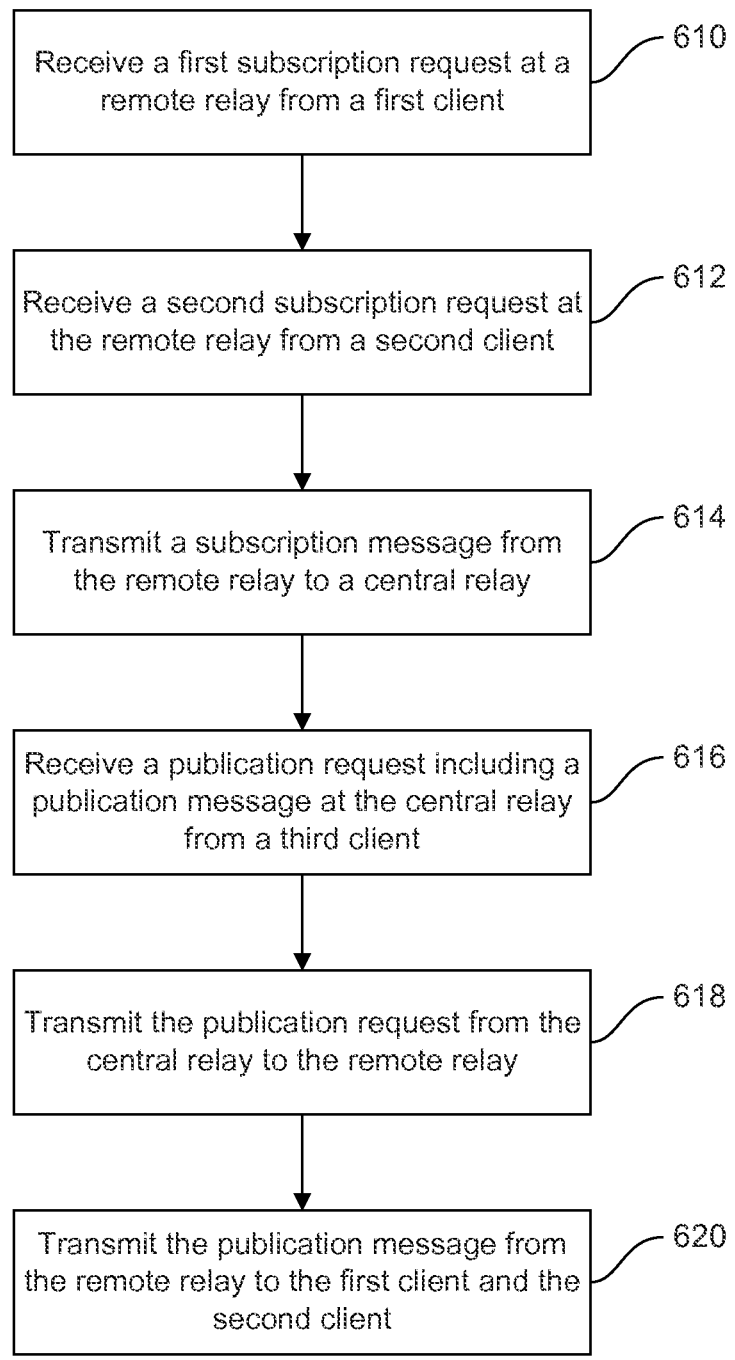
FIG. 6 is a simplified flowchart illustrating a method of subscribing from a remote client and publishing from a central client according to an embodiment of the present invention.

FIG. 6 is a simplified flowchart illustrating a method of subscribing from a remote client and publishing from a central client according to an embodiment of the present invention. The method includes receiving a first request, i.e., a subscription request, at a remote relay (610). The first request is received from a first client. As an example, the first client is a client that is located at a remote location with respect to a central data center. The method also includes receiving a second request at the remote relay from a second client (612). In this example, the second request is a subscription request and the second client is also located at a remote location with respect to the central data center. The remote relay transmits a subscription message to the a central relay (614). In the illustrated, embodiment, the subscription message combines the two subscription requests received from the first and second clients, saving network bandwidth in comparison to systems that send all subscription requests directly to the central relay. Depending on the characteristics of the subscription requests, no aggregation may be performed.

In step 616, a message (i.e., a publication message) is received at the central relay from a third client (616). The third client can be a client co-located with the central relay, a client co-located with another central relay, or a remote client in communication with another remote relay. In some embodiments, the message may be received at the central relay from the third client through a mediation relay. A mediation relay may be a relay connected between a central relay (e.g., central relay 130) and a client (e.g., client 134). The publication message is transmitted from the central relay to the remote relay (618). The publication message can include other information in addition to the publication message, be a variant of the publication message, or the like. The publication message is then transmitted from the remote relay to the first client and the second client (620). A database of the subscription requests is utilized to transmit the message to the clients that have subscribed to the particular message type associated with the publication message.

In addition to the subscription requests received from remote clients, additional subscription requests can also be received from central clients. Thus, when publication requests are received, from either remote clients or central clients, the clients that have requested the particular message type associated with the publication request can receive their publication messages as requested.

It should be appreciated that the specific steps illustrated in FIG. 6 provide a particular method of subscribing from a remote client and publishing from a central client according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
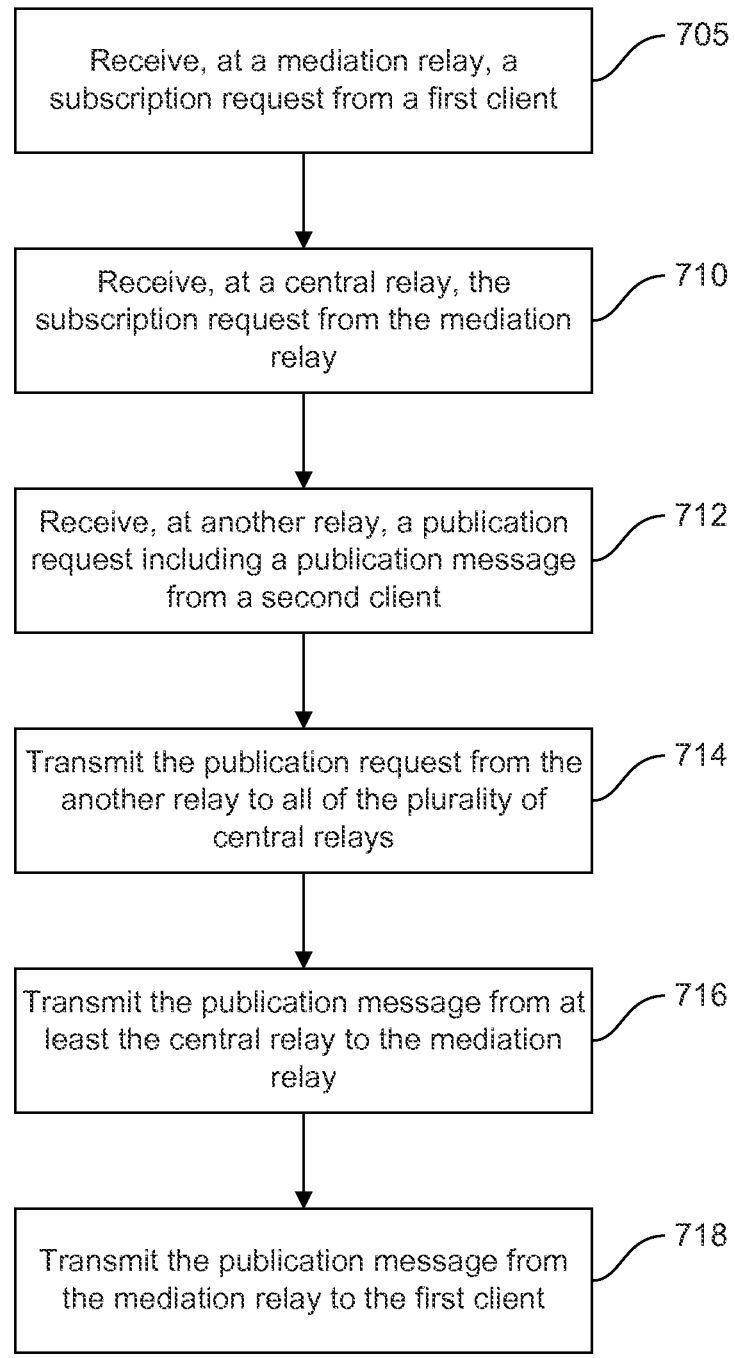
FIG. 7 is a simplified flowchart illustrating a method of subscribing from a central client and publishing from a remote client according to an embodiment of the present invention.

FIG. 7 is a simplified flowchart illustrating a method of subscribing from a central client and publishing from a remote client according to an embodiment of the present invention. The method includes receiving a subscription request at a mediation relay from a first client (705). The subscription request is in turn received at a central relay from the mediation relay (710). The method also includes receiving, at another relay (referred to as an additional relay), a publication request including a publication message from a second client (712). In this example, the first client is a client that is connected to the central relay through the mediation relay and the second client is a client that is located at a remote location with respect to the central relay (a remote client). The additional relay can be either a central relay or a remote relay depending on the particular implementation.

In step 714, the publication request is transmitted from the additional relay to all of the plurality of central relays (714). In the embodiment in which the additional relay is a remote relay, the publication request is transmitted to all of the central relays in accordance with the "publish to all" method described herein. If the additional relay is a central relay, then the publication request is published to all the central relays with the exception of the additional relay, which has already received the publication request. The publication message is transmitted from the central relay to the mediation relay (716). The publication message is in turn transmitted from the mediation relay to the first client (718). In addition, the publication message can be transmitted from the central relay to other clients or to remote relays. If a remote client has subscribed to the message type associated with the publication message, then transmitting the publication message to the client will involve transmitting the publication message to a remote relay and then on to the remote client and possibly other remote clients.

It should be appreciated that the specific steps illustrated in FIG. 7 provide a particular method of subscribing from a central client and publishing from a remote client according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
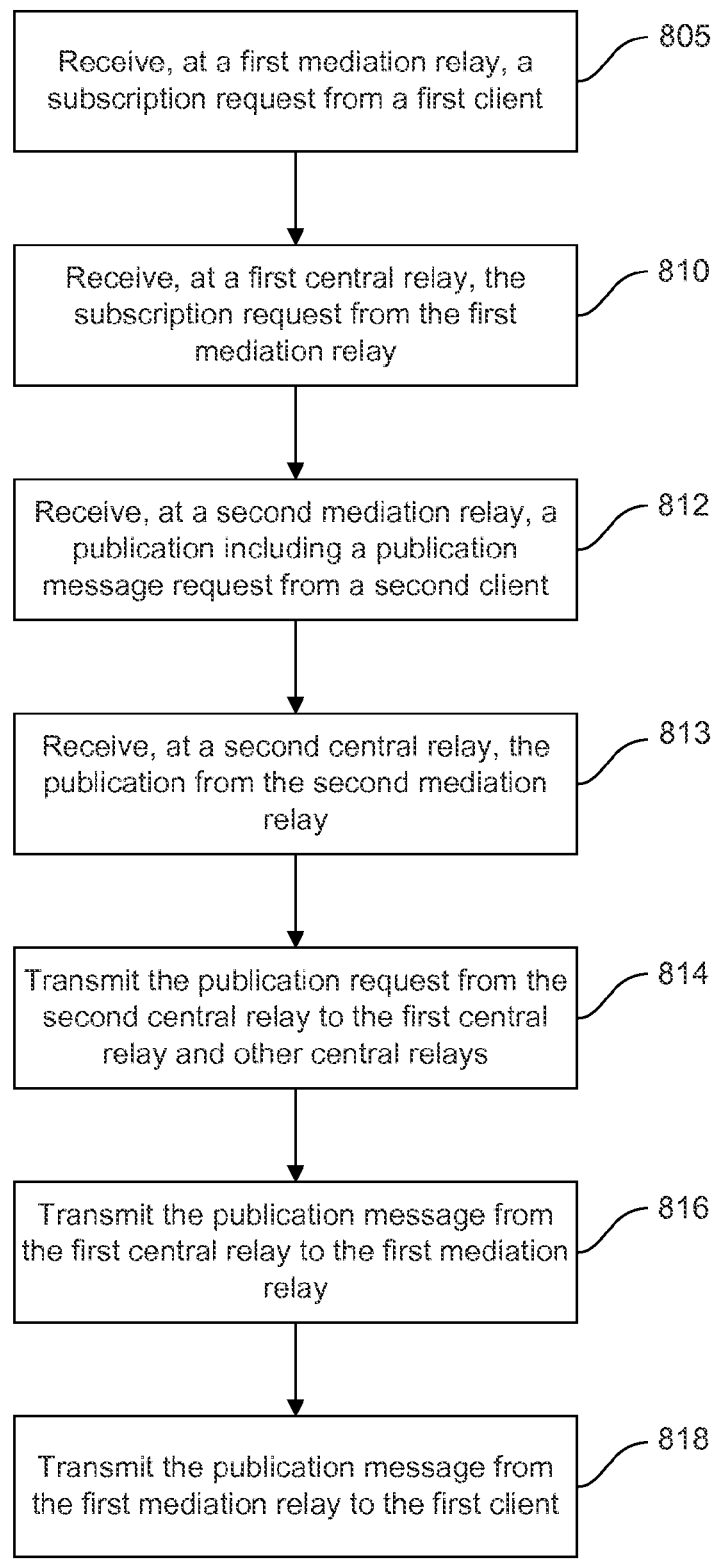
FIG. 8 is a simplified flowchart illustrating a method of subscribing from a central client and publishing from a central client according to an embodiment of the present invention.

FIG. 8 is a simplified flowchart illustrating a method of subscribing from a central client and publishing from a central client according to an embodiment of the present invention. The method includes receiving, at a first mediation relay, a subscribe request from a first client (805). The subscription request is in turn received at a first central relay from the first mediation relay (810). The method also includes receiving, at a second mediation relay, a publication request from a second client (812). The publication is in turn received at a second central relay from the second mediation relay (813). In this example, the first client and the second client are connected to the first and second central relays through the first and second mediation relays, respectivelys. A publication message associated with the publication request is transmitted from the second central relay to the first central relay and the other central relays other than the second central relay (814). The publication message is then transmitted from the first central relay to the first mediation relay (816) and then to the first client (818).

It should be appreciated that the specific steps illustrated in FIG. 8 provide a particular method of subscribing from a central client and publishing from a central client according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
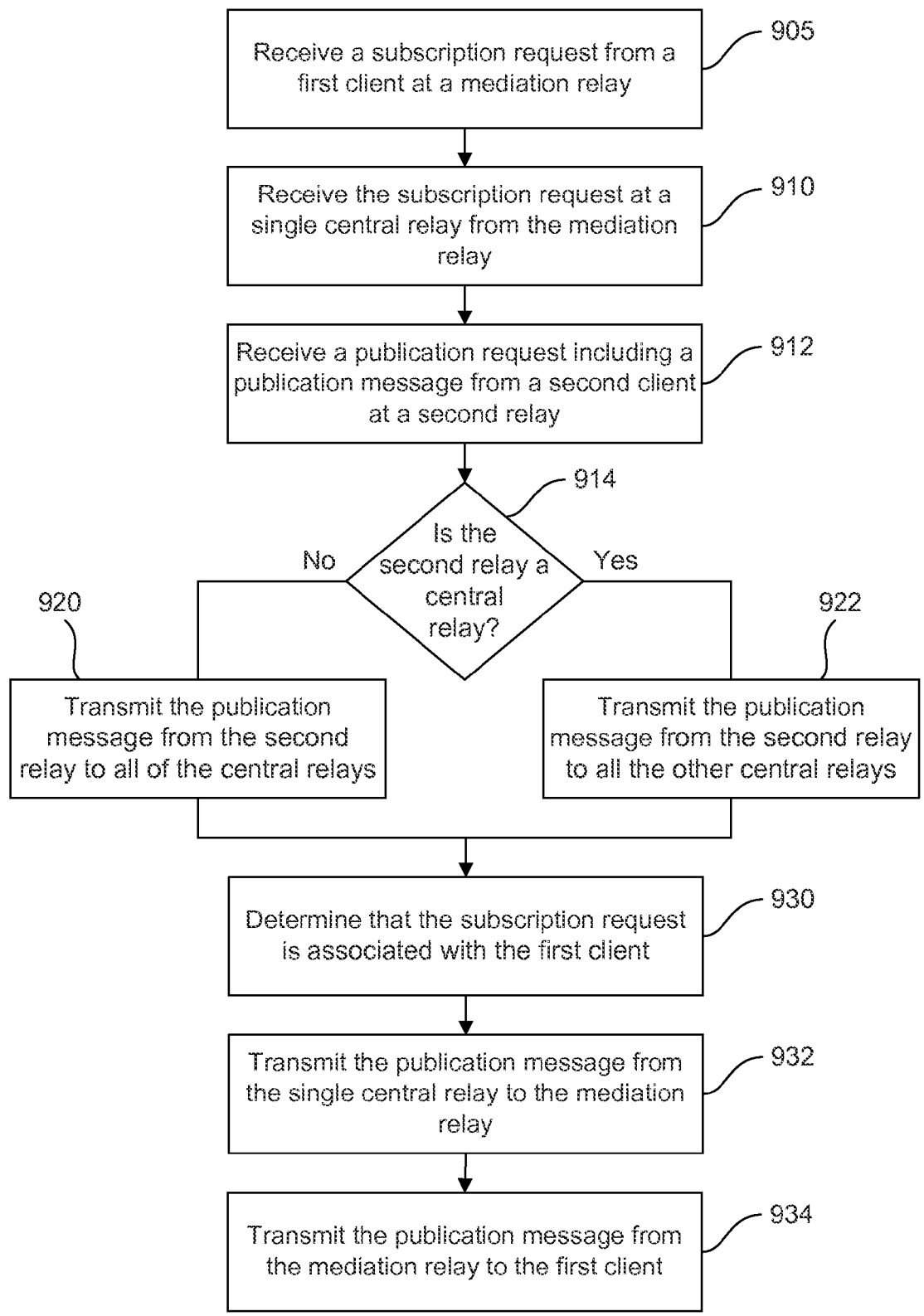
FIG. 9 is a simplified flowchart illustrating a method of subscribing from a first client and publishing from a second client according to an embodiment of the present invention.

FIG. 9 is a simplified flowchart illustrating a method of subscribing from a first client and publishing from a second client according to an embodiment of the present invention. In the embodiment illustrated in FIG. 9, the first client can be a remote client accessing the network through a remote relay or a client connected with a central relay through a mediation relay. Additionally, the first client could be a client that is located remotely and still has a connection to the central relay in the data center, such as a legacy client present before implementation of the hierarchical structure described herein.

The method includes receiving a subscription request from the first client at a mediation relay (905). The subscription request is in turn received at a single central relay from the mediation relay (910). The subscription request indicates a particular type of publication message in which the first client is interested in receiving. The subscription request can be transmitted from a remote client to a remote relay and then on to the single central relay. The subscription request can be transmitted from a client connected to the single central relay through the mediation relay. The method also includes receiving a publication request from a second client at a second relay (912). The publication request includes a publication message of the particular type specified by the first client. The second client can be a remote client accessing the network through a remote relay, a central client, or a client connected to the single central relay through another mediation relay.

A determination is made if the second relay is a central relay (914). If the second relay is a remote relay, then the publication message is transmitted from the second relay to all of the central relays (920). Additional information can be transmitted in addition to the publication message such as variants of the subscription request. If the second relay is a central relay, then the publication message is transmitted from the second relay to all of the central relays with the exception of the second relay (922), which has already received the publication message. Thus, the subscription request was submitted to a single central relay and the publication request, the publication message, or some combination thereof, has been transmitted to all the central relays.

A determination is made that the subscription request is associated with the first client (930) and the publication message is transmitted from the single central relay to the mediation relay (932) and then to the first client (934). It should be noted that other clients can also subscribe in addition to the first client. In this case, the publication message will be transmitted to these additional clients by the appropriate relay.

It should be appreciated that the specific steps illustrated in FIG. 9 provide a particular method of subscribing from a first client and publishing from a second client according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, in order to add additional reliability to the publish/subscribe system, a "publish on behalf of" functionality can be implemented in which the central relays are able to publish messages, not only to the remote relays and central clients from which they have received subscription requests, but to other central relays as well. Referring to FIG. 1B, if the connections between remote relay 122 and central relays 140 and 142 are down, then central relays 130 and/or 132 could be configured to retransmit the publication request after they receive it from remote relay 122. This retransmission would provide the message to central relays 140/142, despite the failure of the connection between them and remote relay 122. In turn, central relays 140/142 can then transmit the message to the remote relays/central clients that have subscribed to the message group. This feature could be implemented in response to inputs from system operators or could be implemented automatically based on a determination that connections have been lost between remote relay 122 and central relays 140/142. In case of a network outage, this backup system will enable messages to be published despite the presence of the network outage. This additional functionality of publishing on behalf of the remote relay that has lost connection to the original central relay is useful since the connections between the remote sites and the data centers are usually more problematic than the high grade connection between two data centers.

In some embodiments, a hierarchical publish/subscribe system may be implemented with load balancing features. Load balancing may provide benefits not available using conventional techniques including redundancy, security, and performance.

Some embodiments of the present invention may provide improvements in relation to the HMS system, introducing a hierarchical architecture with load balancing. In one implementation, there are two levels of hierarchy—remote relays and central relays. Typically, the central relays are located in data centers. However, the invention can be extended to an arbitrary number of levels of the hierarchy.

Figure 11:
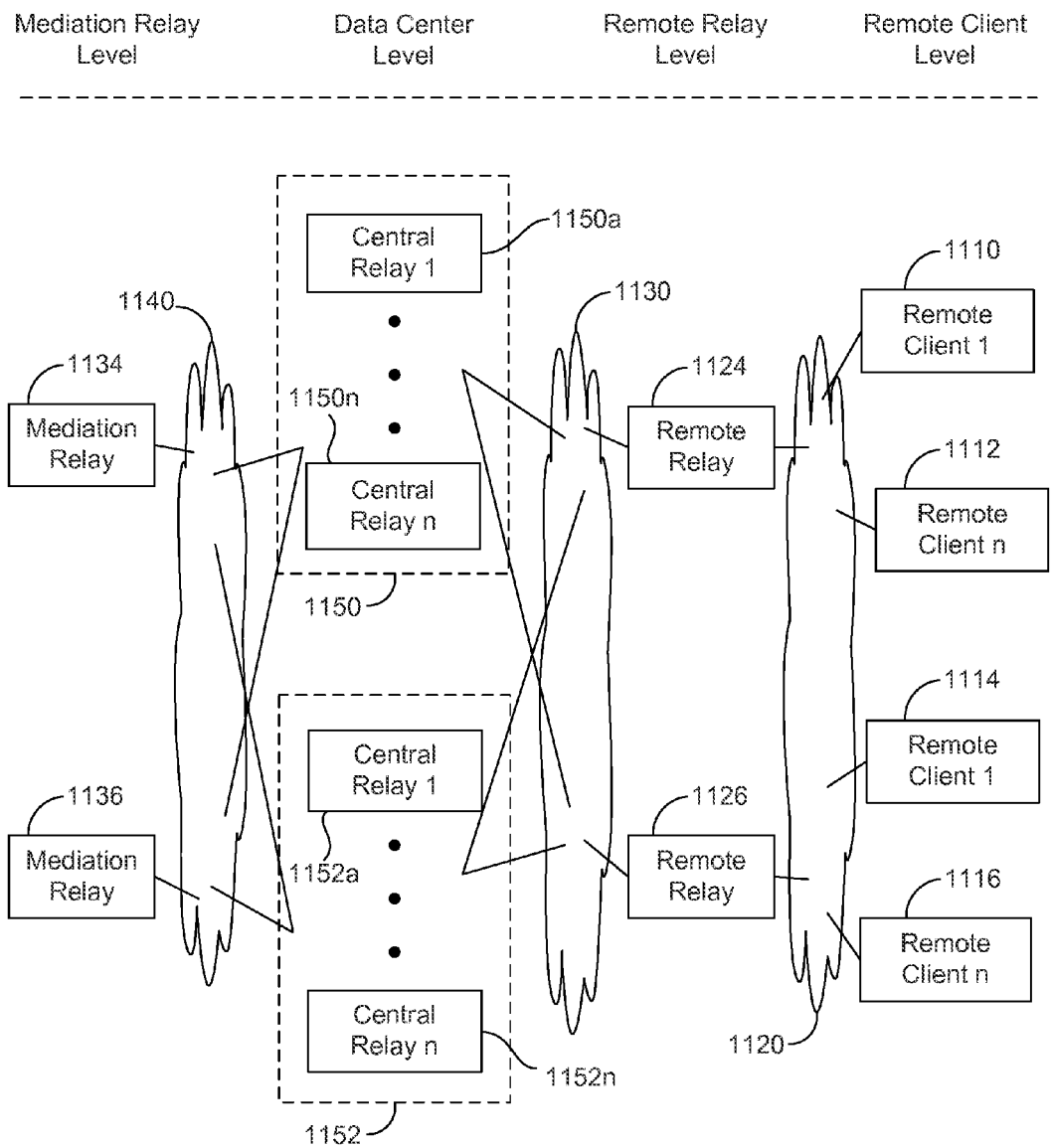
FIG. 11 is a simplified schematic diagram of a hierarchical publish/subscribe architecture according to an embodiment of the present invention.

FIG. 11 is a simplified schematic diagram of a hierarchical publish/subscribe architecture according to an embodiment of the present invention. Referring to FIG. 11, a number of remote clients 1110 and 1112 are connected through a network connection 1120 to a remote relay 1124. The network connection 1120 can be one of several networks, including the Internet or other network suitable for communication between the remote clients 1110/1112 and the remote relay 1124. The remote relay 1124 is connected through network connection 1130 to one or more central relays (Central Relay 1 (1150a) through Central Relay n (1150n)) in a first data center 1150. A mediation relay 1134 is also connected to one or more central relays (Central Relay 1 (1150a) through Central Relay n (1150n)) in the first data center 1150 through network connection 1140. In addition to connection to the first data center 1150, remote relay 1124 and mediation relay 1134 are also connected through network connection 1130 and 1140, respectively, to a second data center 1152. Thus, some embodiments of the present invention may provide a hierarchical publish/subscribe system in which one or more remote relays may be utilized to provide for communications between remote clients and central relays.

FIG. 11 illustrates remote relays connected to remote clients in the Remote Client Level and central relays in the Data Center Level. Although two levels of hierarchy are illustrated in FIG. 11 (one level of central relays and one level of remote relays), embodiments of the present invention are not limited to this particular number of hierarchical levels and other levels of hierarchy are included within the scope of the present invention. As an example, the number of levels of hierarchy could be three levels, four levels, or more levels as appropriate to the particular implementation. Additionally, although remote clients are only connected to the remote relays in the Remote Relay Level, additional remote clients (not illustrated) can be connected through a network connection to mediation relays in the Mediation Relay Level. Moreover, additional remote relays can be provided at the Remote Relay Level and additional mediation relays can be provided at the Mediation Relay Level. One of ordinary skill in the art would recognize many variations, modifications, and alternatives.

The network connections 1120, 1130, and 1140 are illustrated in FIG. 11 as separate networks, but this is not required by the present invention. The network connections can be provided as components of a single network, for example, the Internet, thereby providing for communications between the various remote clients, remote relays, and central relays.

In FIG. 11, a second data center 1152 includes a number of central relays (Central Relay 1 (1152a) through Central Relay n (1152n)). The central relays in the second data center 1152 are in communication with remote clients 1114 and 1116 through a hierarchical structure of remote relay 1126 disposed in the Remote Relay Level. In some embodiments, a subscription request originating at remote client 1110 can be transmitted to the first data center 1150 and the second data center 1152 through remote relay 1124. A publication request from remote client 1114 can be transmitted to the first and second data centers through remote relay 1126. Accordingly, if the message content published by remote client 1114 matches the subscription request submitted by remote client 1110, such content can be provided to remote client 1110 using the publish/subscribe system described herein.

In some embodiments, in order to provide load balancing for traffic through the data centers, subscription and publication messages are transmitted to predetermined central relays. For subscription requests, remote relays or mediation relays record the subscription request when received from a remote client and then forward the subscription request to each central relay in one of the data centers. The central relays receiving the subscription request will record the subscription request. The central relays in the other data center do not receive the subscription request. When a remote client transmits a publication request to a remote relay or a mediation relay, the remote/mediation relay forwards the publication request to one of the central relays in each of the data centers. In an embodiment, the particular central relay in each of the data centers that receives the publication request is defined in configuration data for the remote/mediation relay, enabling different remote/mediation relays to send their publication messages to different central relays.

After receiving the publication request, a central relay that has recorded the corresponding subscription request may then transmit the desired message to the remote/mediation relay from which the subscription request was received. In turn, the remote/mediation relay may transmit the desired message to the remote client that has submitted a subscription request.

Some embodiments of the present invention utilizing the hierarchical architecture described herein are suitable for applications including systems that monitor network traffic, including DNS resolution systems (e.g., SDNS, TGV, Whois, and the like). Some embodiments of the present invention are also suitable for use in other publish/subscribe systems, providing load balancing at the application level that will increase system performance and security. It should be noted that in contrast with conventional techniques that provide load balancing at the network level (e.g., packet load balancers), some embodiments of the present invention provide load balancing at the application level.

Figure 12A:
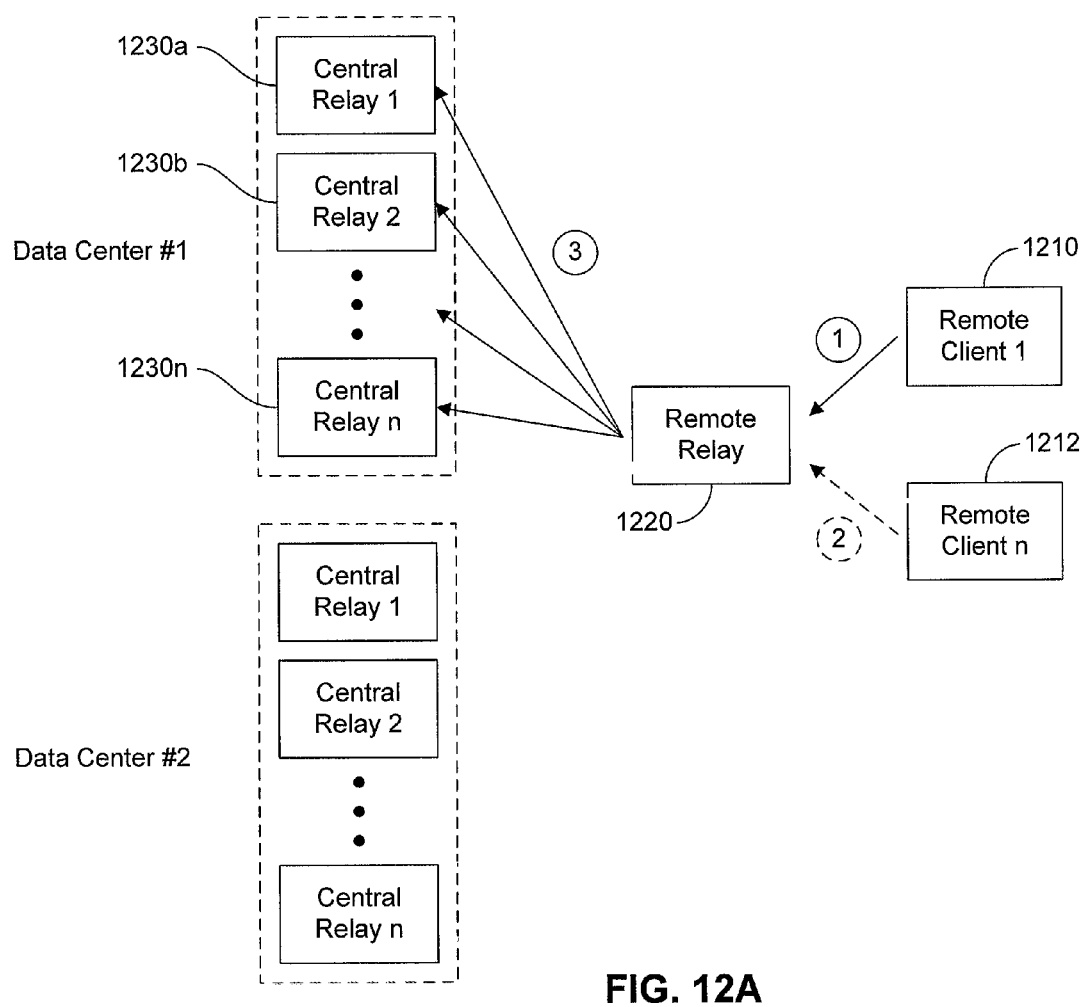
FIG. 12A is a simplified schematic diagram of a remote client and a remote relay transmitting a subscription request to multiple central relays according to an embodiment of the present invention.

FIG. 12A is a simplified schematic diagram of a remote client and a remote relay transmitting a subscription request to multiple central relays according to an embodiment of the present invention. Remote client 1210 (one of n remote clients in communication with mediation relay 1220) transmits a subscription request to mediation relay 1220 (Process 1). The subscription request will include a target. As an example, remote client 1210 may be interested in messages "starting with x." An optional subscription request originates from remote client 1212 (Process 2). The optional subscription request can be for the same type of message or for a different type of message, for example, messages "starting with y." In an embodiment, if the subscription request is for the same type of message, then remote relay 1220 will perform an aggregation or consolidation function, recording an indication that both remote client 1210 and remote client 1212 are interested in the particular message type. Since a subscription message will have already been sent out for these subscriptions that have already been requested by another remote client, the remote relay will perform a condensing function, just adding the identity of the newly subscribing remote client to a listing based on the original subscription request. Such a listing can be stored in a computer-readable memory of the remote relay.

Referring to FIG. 12A, after a new subscription request is received by remote relay 1220, the remote relay records the subscription request so that the target in the subscription request can be compared against messages received by the remote relay at a later time. The remote relay 1220 then forwards a subscription message to all of the central relays 1230a-1230n associated with Data Center #1 (Process 3). As mentioned above, if the subscription is not a new subscription to the remote relay, the condensing function will be performed and no additional subscription message will be sent to the central relays. As illustrated in FIG. 12A, two data centers, Data Center #1 and Data Center #2 are provided as part of the hierarchical publish/subscribe system. In other embodiments, additional data centers could be provided. The provision of multiple data centers provides for system redundancy and improved security and performance. The central relays 1230a-1230n illustrated in FIG. 12A can be co-located in a physical facility or geographically distributed as appropriate to the particular system implementation. In an embodiment, the central relays are co-located in a secure facility managed by the present assignee.

In some embodiments, the subscription message is transmitted to all of the central relays in the first set of central relays (Data Center #1). In the illustrated example, there are three central relays illustrated, but fewer central relays or a greater number of central relays are included within the scope of the present invention. The subscription message is not sent to the central relays in the second set of central relays (Data Center #2). In an alternative embodiment, a variant of the subscription message including the target is transmitted to each of the central relays in the first set of central relays. In some embodiments, the remote relays may store configuration data defining the set of central relays to which a particular remote relay will transmit subscription messages. In some embodiments, transmission of the subscription message to only one set of central relays will eliminate duplicate message delivery and provide for load balancing of publication messages. The central relays that receive the subscription message may record information related to the subscription message if it is a new subscription. If the subscription message is not new, then the central relay may perform a condensing function as discussed in relation to receipt of subscription messages by remote relays. As an example, if the target in the subscription message has already been processed by the central relay, then the identity of the remote relay may be added to the listing including the target and the identities of other remote relays that have already subscribed in relation to the target.

In some embodiments, Central Relays 1150*a* through 1150*n* are co-located in a first data center 1150 and Central Relays 1152*a* through 1152*n* are co-located in a second data center 1152, with the dashed lines 1150 and 1152 representing a geographical boundary, that is, the geographical area associated with the data centers. It is also possible to have multiple levels of hierarchy without having multiple geographies. In the embodiment illustrated in FIG. 11, two levels of remote relays and a level of central relays, all at different geographical locations are illustrated, although this is merely an example and the present invention is not limited to this particular example. The present assignee maintains remote clients (also referred to as edge sites or remote sites) located in many countries throughout the world. Additionally, the present assignee maintains multiple data centers connected to these remote clients through one or more levels of remote relays. Therefore, although only two data centers are illustrated, the present invention is not limited to this particular implementation.

Figure 12B:
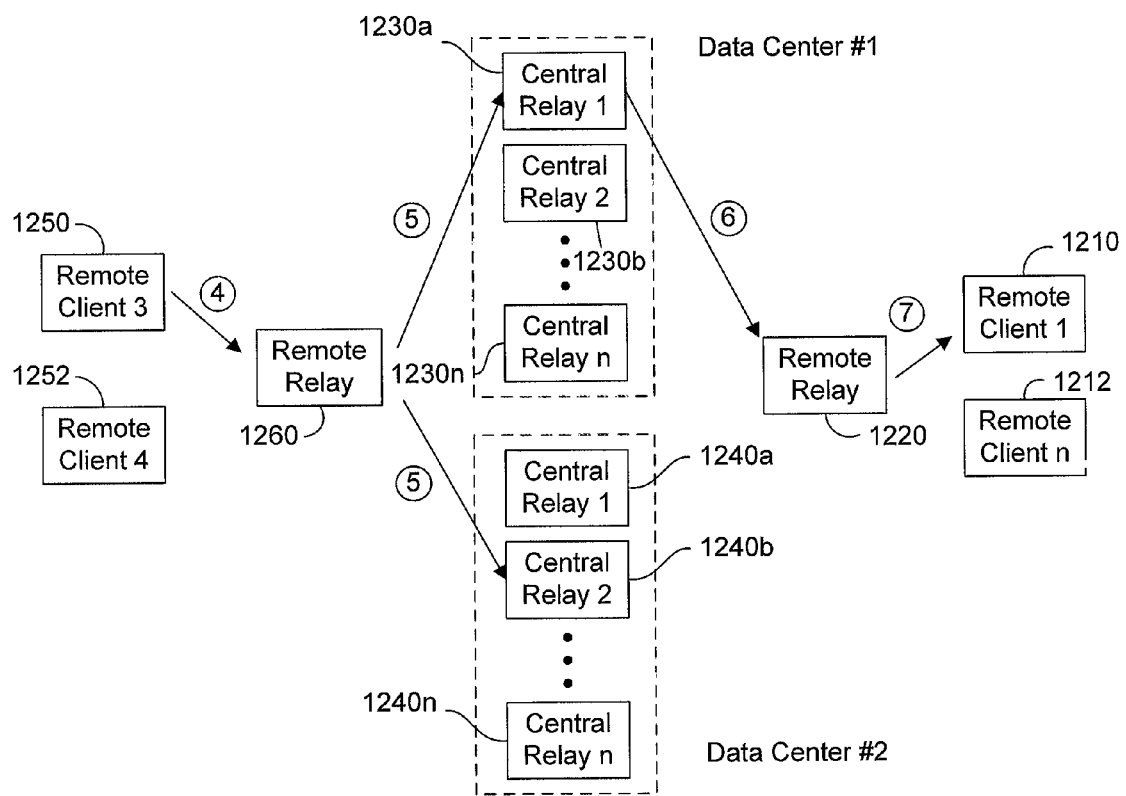
FIG. 12B is a simplified schematic diagram of a remote client and a remote relay implementing publication of a message to multiple central relays according to an embodiment of the present invention.

FIG. 12B is a simplified schematic diagram of a remote client and a remote relay implementing publication of a message to multiple central relays according to an embodiment of the present invention. Remote client 1250 transmits a publication request to remote relay 1260 (Process 4). The publication request may be a message including performance statistics or the like. Thus, the term request is used in a sense that does not require a reply. As discussed above, statistics related to the performance of the remote client 1250 could be transmitted to remote relay 1260 for distribution to interested clients. The publication request will include a message string characterized by a pattern. When the remote relay 1260 receives the publication request, a publication message is transmitted from remote relay 1260 to a first central relay of the first set of central relays (e.g., Central Relay 1230*a*) and a second central relay of the second set of central relays (e.g., Central Relay 1240*b*) (Process 5). The publication message, which may be the same as the publication request or a variant of the publication request, will include the message string. Thus, the publication message is transmitted to one central relay in the first set of central relays and one central relay in the second set of central relays. Therefore, this embodiment of the present invention provides a hierarchical publish/subscribe system in which subscription messages are received by all of the central relays in one set of central relays (Process 3) and publication messages are received by one central relay in each set of central relays (Process 5).

Since the subscription message was received by all of the central relays in the first set (Data Center #1), the central relay that receives the publication message (Central Relay 1230*a*) is able to determine a match between the pattern in the publication message and the target in the subscription message. As an example, if the target was "DNST" and the pattern was "DNST100," then central relay 1230*a* would determine that the target matched a portion of the pattern, indicating that the central relay had received a subscription message from a remote relay interested in this type of message. Thus, a determination is made of whether the pattern satisfies a condition associated with the target.

Since the subscription message was not received at the second set of central relays (Data Center #2), the receipt of the publication message by Central Relay 1240*b* does not result in a match between the target and at least a portion of the pattern. Some embodiments of the present invention provide for application level load balancing since the publication message load is distributed between the various central relays in the data centers. Preferably, when subsequent publication messages are received at the data centers from other remote relays, the messages will be distributed, on average, approximately uniformly between the various central relays in the data centers. Thus, rather than having a single central relay perform most of the publication tasks, the workload is distributed between the various central relays. Although each central relay in a data center receives the subscription message and records the target, the publication message is only received by one central relay in the data center, resulting in only a single central relay processing the publication message to determine a match between the pattern and the target.

Once Central Relay 1230*a* has determined a match, the message string is transmitted to remote relay 1220 (Process 6), which is included in a list maintained by the central relay indicating an interest in this particular message type. In addition to the message string, additional information may be included along with the message string. Remote relay 1220, in turn, determines that the target matches at least a portion of the pattern and transmits the message string to remote client 1210 (Process 7). If remote client 1212 had submitted a similar subscription request (Optional Process 2), then the message string would be transmitted to remote client 1212 as well.

In implementations in which there is only one set of central relays, embodiments of the present invention will still provide for application level load balancing. In these implementations, subscription messages will be delivered to each central relay in the set, i.e., all the central relays in the system. The publication message will then be transmitted to and received by one of the central relays. The central relay receiving the publication message will then communicate the publication message to the subscribing remote relay(s). Therefore, even in implementations with a single set of central relays, the model of "subscribe to all and publish to one" will result in application level load balancing. It will be noted that in this single set implementation, the publication message will be sent to one central relay in the set of central relays rather than to one central relay in each of the multiple sets of central relays.

FIGS. 12A-12B illustrate remote clients that are able to both subscribe and publish. Typically, data (e.g., performance reporting, raw data packets that are sampled, authorization requests, and the like) constitutes the majority of traffic flowing from the remote clients to the data centers, while commands constitute the majority of the flow from the data centers to the remote clients. In other applications, the data and command flow may be varied. One of ordinary skill in the art would recognize many variations, modifications, and alternatives.

Figure 13:
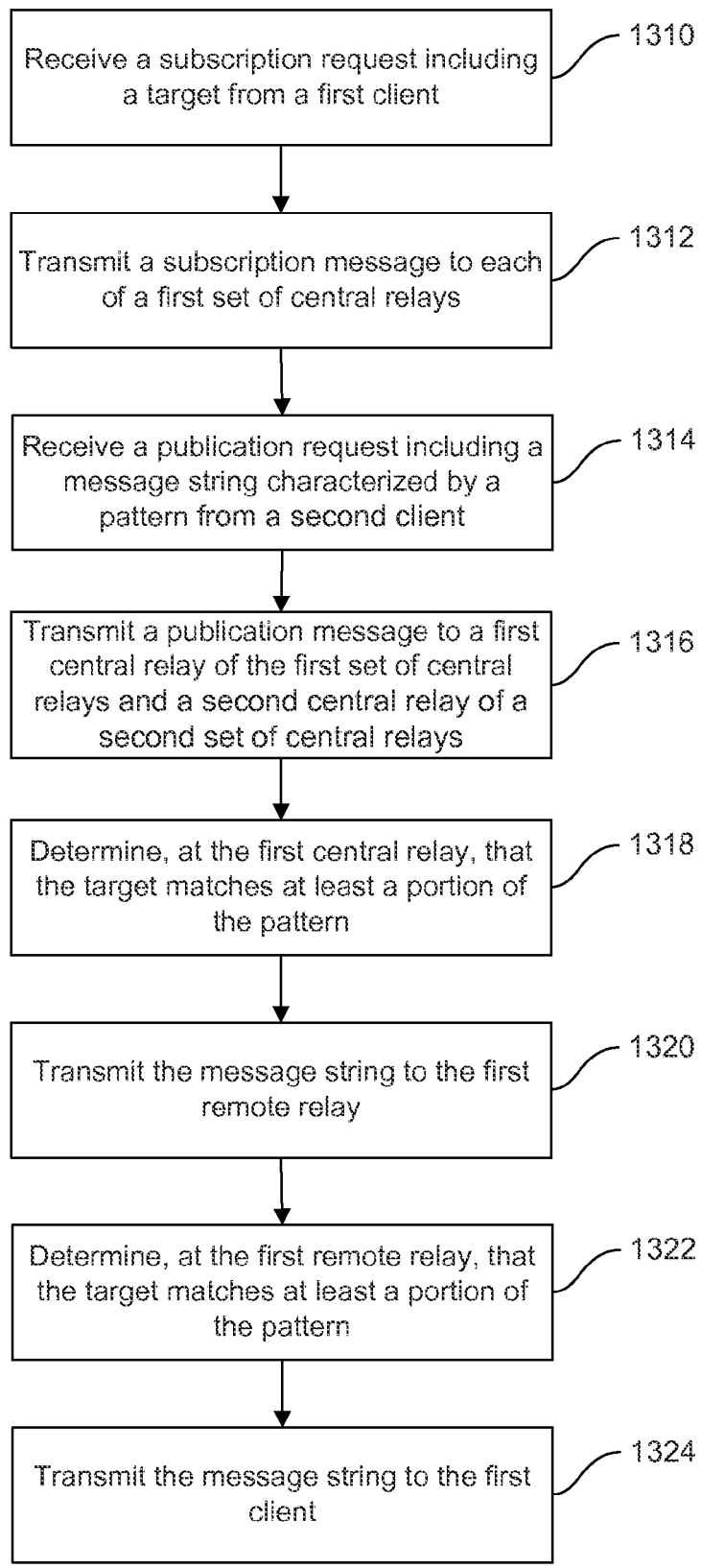
FIG. 13 is a simplified flowchart illustrating a method of implementing publication message load balancing in a publish/subscribe system according to an embodiment of the present invention.

FIG. 13 is a simplified flowchart illustrating a method of implementing publication message load balancing in a publish/subscribe system according to an embodiment of the present invention. The method includes receiving a subscription request at a first remote relay from a first remote client (1310). The identity of the first remote client is recorded at the first remote relay along with a target. The target will be used to determine a match between a message string that is subsequently received by the first remote relay and the target. In other words, the remote relay stores an indication that the first remote client is interested in a particular type of publication message. The subscription message may be common to multiple remote clients, providing for aggregation of subscription requests and improvements in system efficiency.

A subscription message is transmitted from the first remote relay to each of a first set of central relays (1312). The subscription message includes the target, providing the central relays with an indication that the first remote relay is interested in the particular type of publication message indicated by the first remote client. As illustrated in FIG. 12A, the subscription message is transmitted to all of the central relays in the first set of central relays. The subscription message is thus only transmitted to one of the sets of central relays in this illustrated embodiment. The particular set of central relays to which the subscription message is transmitted is defined in configuration files for the remote relay, defined during handshaking operations, assigned by a system operator, or the like. The central relays in the first set of central relays record information related to the subscription message, for example, the target and the identity of the first remote relay. The subscription message may pass through one or more remote relays before it reaches the central relays.

The publication portion of the publish/subscribe system is initiated when a publication request is transmitted from a second remote client to a second remote relay (1314). The publication request includes a message string characterized by a pattern. The second remote relay is one of a number of remote relays that are in communication with the central relays illustrated in FIG. 12B. A publication message is transmitted from the second remote relay to a first central relay of the first set of central relays and a second central relay of a second set of central relays (1316). The publication message includes the message string characterized by the pattern. The particular central relays to which the publication message is transmitted are defined in configuration files for the remote relay, defined during handshaking operations, assigned by a system operator, or the like. By transmitting the publication message to one central relay in each set, duplication of publication messages is eliminated. In some embodiments, the traffic load on the central relays is monitored and adaptive control of the remote relays is implemented in order to improve the load balancing performance of the system.

All of the central relays in the first set of central relays (including the first central relay) received the subscription message. However, none of the central relays in the second set of central relays (including the second central relay) received the subscription message. Thus, when the publication message is received by the first central relay, it is able to determine that the target matches at least a portion of the pattern (1318). On the other hand, since the central relays in the second set of central relays did not receive the publication message, no match is found between the pattern and the targets stored in the central relays of the second set of central relays. Of course, if at some previous time, another remote relay had submitted a subscription message including the target to the second set of central relays, the second central relay would determine a match in a manner similar to the first central relay. However, in the method illustrated in FIG. 13, a simplified example is provided for purposes of clarity.

After determining a match, the first central relay transmits the message string to the first remote relay in response to determining that the first remote relay is interested in the message type associated with the publication message (1320). Although in this particular example, the publication message is sent only to the first remote relay, one of skill in the art will appreciate that the publication message can be sent to multiple remote relays by the first central relay. For example, if the first central relay had received subscription messages with the same target from 15 of 90 remote relays, then when a publication message having a pattern partially or wholly matching the target is received, the first central relay would then transmit the publication message or a variant thereof to the 15 remote relays that had subscribed for this particular message type. One of ordinary skill in the art would recognize many variations, modifications, and alternatives.

At the first remote relay, a determination is made that the target matches at least a portion of the pattern (1322). Based on the match, the first remote relay transmits the message string to the first client (1324). Thus, the first client is able to receive the desired information in response to the initial subscription request.

It should be noted that although a single subscription request and a single publication request are used in the method illustrated in FIG. 13, the present invention is not limited to this particular implementation. Multiple subscription requests can be received, processed, and transmitted to the central relays by the remote relays. Multiple remote relays can be in communication with the central relays, transmitting subscription messages to one set of central relays. Thus, although only two remote relays are illustrated in FIG. 12A and FIG. 12B, a much greater number, for example, 80 or more remote relays, are in communication with the central relays in some implementations. The particular number of remote relays and the number of levels of hierarchy are dependent on the particular application. One of ordinary skill in the art would recognize many variations, modifications, and alternatives.

It should be appreciated that the specific steps illustrated in FIG. 13 provide a particular method of implementing publication message load balancing in a publish/subscribe system according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 14 is a chart illustrating message flow in a publish/subscribe system according to an embodiment of the present invention. The left hand column lists events. The middle column and the right column list actions taken by a remote/mediation relay or a central relay, respectively, in response to the event. Referring to the first row of the chart, if a subscription request/subscription message is received by a remote/mediation relay, it will record the subscription as long as the subscription is not a duplicate. If the subscription request is a duplicate request from a particular remote client, then the remote/mediation relay will discard this duplicate request. Additionally, if a similar subscription request has already been received from another source, the remote/mediation relay can update its database with the identity of the new requester so that the new requester will be associated with the target that is already stored. During the recording process, the identity of the requester, for example, a remote client or another remote relay, will be stored along with a target associated with the request. Typically, if the subscription request/message is new, then it will be transmitted by the remote/mediation relay after the recording process. Alternatively, multiple requests can be bundled by the remote/mediation relay before transmission in a batch mode of operation. If the remote/mediation relay is in a layer of the hierarchy adjacent to the central relays (e.g., Remote/Mediation Relay Level in FIG. 11), the remote/mediation relay will transmit a subscription message to each central relay in one set of central relays.

Continuing in the first row of the chart, if a subscription request is received by a central relay, the subscription will be recorded. Thus, when publication messages are received, the publication message, some portions thereof, or a variant thereof, can be transmitted to remote relays based on the information recorded by the central relay. Typically, the identity of the remote relay and the target are included in the subscription request.

The second row of the chart relates to receipt of a publication request from a remote client. The remote/mediation relay will forward a publication message related to the publication request to one central relay in each set of central relays. The publication message can be the publication request received from a remote client, a portion of the publication request, a variant of the publication request, or the like. As an example, the message string from the publication request could be forwarded to the central relays. In addition, the remote/mediation relay may publish the publication to any directly connected client subscribers. The right column of the second row is blank because in one implementation, no remote clients are directly connected to central relays. In this implementation, all remote clients connect to central relays through a mediation relay and publication requests are thus not received at a central relay from a remote client. In other implementations, remote clients can be directly connected to central relays without connection through a mediation relay.

The third row of the chart relates to receipt of a publication message from a remote relay. The left column of the third row is blank because in one implementation, no remote relays connect to other remote relays. If the publication message is received at a central relay, then the publication message will be transmitted to remote/mediation relays that have subscribed to the particular message type. As discussed in relation to FIG. 13, a determination will be made if at least a portion of the message string matches the target stored by the central relay.

The fourth row of the chart relates to receipt of a publication message from a central relay. When a remote relay adjacent to remote clients in the hierarchy receives such a publication message, it will transmit the publication message to remote clients that have subscribed to the particular message type. As discussed in relation to FIG. 13, a determination will be made if at least a portion of the message string matches the target stored by the remote relay. If the remote relay that receives the publication message is not adjacent to the remote clients in the hierarchy, it will forward the publication message to any remote relays in the next lower level of the hierarchy that have subscribed to the particular message type. In turn, the remote relays in the next lower level of the hierarchy will continue to forward the publication message until the message is delivered to the subscribing remote clients.

Figure 15:
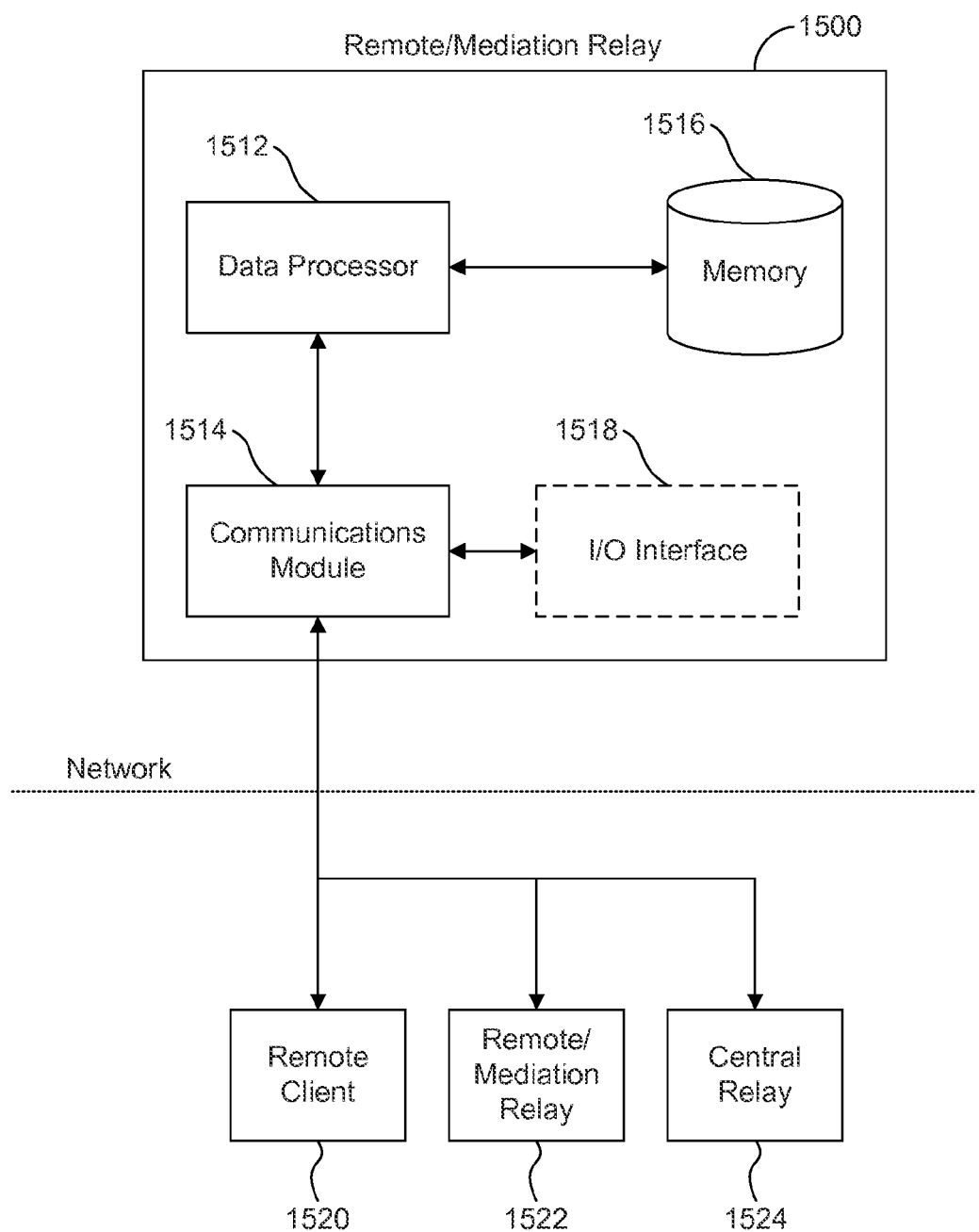
FIG. 15 is a simplified schematic diagram of elements of a remote relay according to an embodiment of the present invention.

FIG. 15 is a simplified schematic diagram of elements of a remote/mediation relay according to an embodiment of the present invention. The remote/mediation relay 1500 includes a processor 1512 (also referred to as a data processor), a communications module 1514 and a memory 1516. The processor 1512 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 1512 is coupled to the memory 1516 in order to store and access stored information for use during operation of the hierarchical publish/subscribe system. The memory (also referred to as a database or a computer readable medium) 1516 can be local or distributed as appropriate to the particular application. An example of memory is a hard drive, flash memory, or the like. An optional input/output interface 1518 is provided to facilitate control of the remote/mediation relay by a system operator. The optional I/O interface 1518 also provides a mechanism for delivering performance reports to a system operator, other suitable personnel, or suitable computer systems. More typically, the remote/mediation relay is controlled through the communication module 1514, through which a system operator can interact with the remote/mediation relay. The communications module 1514 also provides for communication between the remote/mediation relay and remote clients 1520, other remote/mediation relays 1522, and/or central relays 1524.

In some embodiments, a message received at a server (e.g., a remote relay or a central relay) may only be published to subscribers (e.g., clients) directly connected to that server, without being transmitted further to higher level remote relays and/or central relays. Such functionality can also be referred to as "Publish-Local."

In a large scale publish/subscribe system involving multiple servers, especially when there are additional servers for redundancy purposes, a message may need to be forwarded internally to all servers that have potential subscribers attached to those servers and subscribing for that message. This may increase the total amount of message traffic throughout the system. In some embodiments, in order to lessen the total amount of traffic, a server may publish a received message only to local subscribers (e.g., subscribers attached/connected to that server) if, for example, the message only apply to the local subscribers, and does not send the message to a higher level server (e.g., a higher level remote relay) or a central relay. To determine if a message applies only to the local subscribers, the server receiving the message may look for indications from the publisher or make the determination according to a predetermined policy rule. For example, the policy rule may be based on policy control, information sensitivity, information availability, etc.

In some embodiments, Publish-Local may be implemented to control information availability to different group of users. For example, if it is desirable that certain information is only available to local subscribers, the Publish-Local functionality may block such information from going further in the hierarchy.

In some embodiments, the Publish-Local concept may be extended in a hierarchical fashion to an arbitrary number of levels. For example, the concept can be extended to Publish-Regional, Publish-Country, Publish-Continent, etc. In another embodiment, the concept can be extended to include particular geographical regions or virtual geographical regions. For example, message publication can be limited to a named remote geographical region, such as publishing to Region-A, or Region-B, or combinations of geographical regions.

In some embodiments, the Publish-Local functionality can be implemented in a hierarchical publish/subscribe system, such as the exemplary system shown in FIG. 11. Referring to FIG. 11, remote relay 1124 in level 2 may be configured to publish messages received from remote client 1 (1110) only to local subscribers, including remote client n (1112). For example, remote client n (1112) may submit a subscription request to remote relay 1124. The subscription request may include a target, e.g., "DNST." Upon receiving the subscription request, remote relay 1124 may record the subscription information of remote client n based on the subscription request. Thereafter, remote client 1 (1110) may send a publication request to remote relay 1124 to publish a message including a string characterized by a pattern, e.g., "DNST10031." Upon receiving the publication request from remote client 1 (1110), remote relay 1124 may determine that the target "DNST" matches at least a portion of the pattern "DNST10031." In one embodiment, remote client 1 (1110) may indicate that the message is to be published locally. In another embodiment, remote relay 1124 may determine if the publication request is a local publication request based on a predetermined policy rule. For example, the policy rule may indicate that all message from remote client 1 (1110) are to be published locally. In another example, the policy rule may indicate that messages including a specific pattern should be published locally. In another example, the policy rule may indicate that no message will be forwarded to a higher level remote relay (e.g., remote relay 1134 in level 1) and/or a central relay (e.g., central relay 1150a), and all publish messages received from remote client 1 to remote client n should be published locally. One of ordinary skill in the art would recognize many variations, modifications, and alternatives. If the publication request is determined to be a local publication request (e.g., to be published locally), remote relay 1124 may transmit the message string to remote client n (1112) subscribing such messages, and not forward to remote relay 1134. If it is determined that the message is not to be published locally, remote relay 1124 may forward the message to a central relay (e.g., through one or more higher level remote relays).

Similar configuration can also be implemented in remote relay 1134. Because remote relay 1134 is in a higher level, publication requests may be originated from clients directly attached to remote relay 1134, as well as from remote clients 1 to n and forwarded by remote relay 1124. For example, in level 2, the Publish-Local functionality may correspond to Publish-City, and in level 1, the Publish-Local functionality may correspond to Publish-State. One of ordinary skill in the art would recognize many variations, modifications, and alternatives. It should be noted that although FIG. 11 only shows two levels of remote relays, more levels of remote relays are also included in the scope of the present invention.

In some embodiments, Publish-Local can also be implemented in a central relay. In this case, when a message sent by a client attached to a central relay is determined to be published locally, the message will not be forwarded to other central relays. Instead, the message will be transmitted to only those local subscribers attached to the central relay and subscribing to the message.

Figure 16:
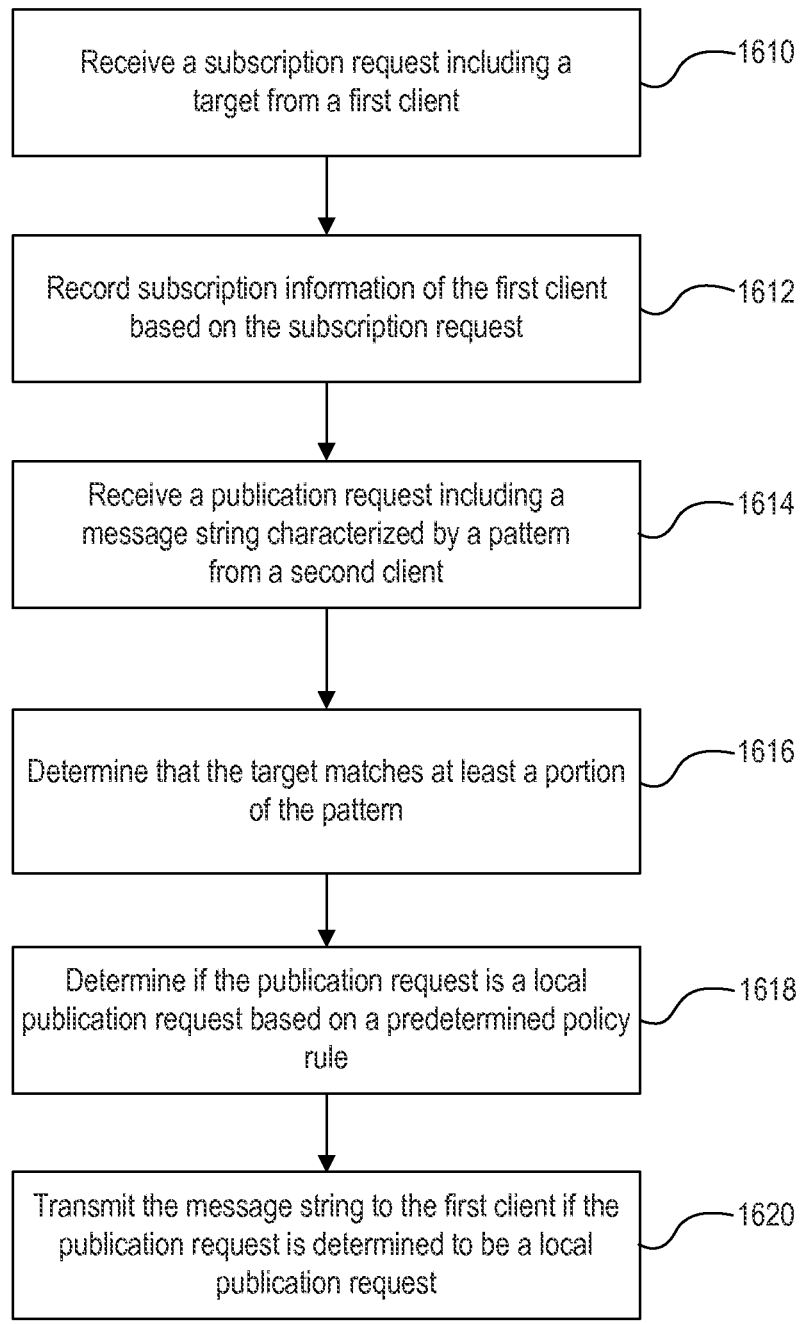
FIG. 16 is a simplified flowchart illustrating a method of subscribing from a first client and publishing from a second client according to an embodiment of the present invention.

FIG. 16 is a simplified flowchart illustrating a method of subscribing from a first client and publishing from a second client according to an embodiment of the present invention. The method includes receiving a subscription request at a first relay from a first client (1610). Subscription information, such as the identity of the first client is recorded at the first relay along with a target (1612). The target will be used to determine a match between a message string that is subsequently received by the first relay. In other words, the first relay stores an indication that the first client is interested in a particular type of publication message. The subscription message may be common to multiple remote clients, providing for aggregation of subscription requests and improvements in system efficiency.

The publication portion of the publish/subscribe system is initiated when a publication request is transmitted from a second client to the first relay (1614). The publication request includes a message string characterized by a pattern.

At the first relay, a determination is made that the target matches at least a portion of the pattern (1616). The first relay also determines if the publication request is a local publication request based on a predetermined policy rule (1618). Based on the determination, the first relay transmits the message string to the first client (1620). Thus, the first client is able to receive the desired information in response to the initial subscription request.

In some embodiments, Publish-Local functionality may reduce load on the overall messaging service. As a result, additional capacity can be handled at lower cost, and with reduced networking cost, in addition to reduced server cost. In some embodiment, Publish-Local functionality may enhance security, not only for the system but also for clients who are connected to the system at least because their messages are constrained to a smaller subset of servers and therefore not accessible elsewhere.

In some embodiments, a publish/subscribe system may allow a black-listing capability on a server (e.g., a remote relay and/or a center relay). With the black-listing enabled, any publish messages received from a server on the black list are ignored. The black-listing functionality can also be referred to as deny-publish.

Deny-publish functionality can be used to enforce security. In some embodiments, it may be used to prevent lower levels of the publish/subscribe hierarchy from affecting higher levels. For example, a local server may be used for testing purposes. In this example, it would be acceptable and desirable to allow publications from higher levels of the hierarchy to lower level servers (including the local server) because listening for messages applies to the lower level servers. However, it would be unacceptable to allow the lower level servers to generate traffic for other servers in the overall service, since it is merely test traffic. In this case, deny-publish functionality may be used to address security concerns, and stop unwanted publish traffic from polluting the rest of the service. In some embodiments, deny-publish is implemented by maintaining a black-list on a server. Any publish messages received from a server on the black list are ignored.

Deny-publish functionality may protect higher level servers from attacks generated from a lower level server, or being over-run with a flood of messages. In some embodiments, deny-publish functionality may be selectively turned on and off.

Many benefits can be achieved by way of the present invention over conventional techniques. For example, by introducing a hierarchical structure for a publish/subscribe system, the number of connections from remote sites to central sites can be greatly reduced. A reduction in the number of connections may result in decreased system complexity in relation to configuring, maintaining, and running the IP network, enhanced security, and improved system performance. Additionally, some embodiments of the present invention may enhance system performance by reducing the number of duplicate subscriptions. Moreover, some embodiments of the present invention enable clients to post messages to and receive messages from remote relays, even while the server process is not running on a central relay. Additionally, data can be logged during operation, providing an audit trail.

Moreover, some embodiments of the present invention enable system scalability by increasing the performance of the system as a whole in terms of messages per second that can be handled. As an example, if the traffic is being balanced across three application load balancing servers that are all performing about the same amount of work, each server is handling one third of the traffic for that site. Adding a fourth sever will increase the capacity since each server would then handle one fourth of the current traffic at the site. Due to the spare capacity on each server resulting from the addition of the fourth server, the overall capacity can be increased as the traffic rate increases. Some embodiments of the present invention enable practically arbitrary increases in system scalability.

Furthermore, some embodiments of the present invention provide systems that are characterized by both high availability and reliability. For example, when a client or server sends a message to a set of load balanced servers, it has the responsibility to send it to a server to which it has valid connection. Having more servers as elements of the system enables messages to still be transmitted through the system, even with more of the servers being in a failed state. For instance, if there are two servers in a set and both are in a failed state, the sender is not able to send the message using either server. However, if there are, for example, five servers in a set and two are in a failed state, three servers are still available to transmit the message through the system.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for publishing a message, the method comprising:

receiving, at a first relay, a subscription request from a first client, wherein the subscription request includes a target;

recording, at the first relay, subscription information of the first client based on the subscription request;

receiving, at the first relay, a publication request from a second client, wherein the publication request includes a message string characterized by a pattern;

determining, by the first relay, that the second client is not on a black list of clients stored at the first relay;

determining, by the first relay, that the target matches at least a portion of the pattern;

determining, by the first relay, that the publication request is a local publication request based on a predetermined policy rule, wherein the local publication request is a publication request for one or more clients connected to the first relay, wherein the predetermined policy rule comprises one or more of: designating publication requests from a particular set of one or more clients as local publication requests, or designating publication messages having a specific pattern as local publication requests; and transmitting the message string to the first client based on the determining that the publication request is a local publication request.

2. The method of claim 1, comprising transmitting a publication message from the first relay to a central relay if the publication request is determined to be not a local publication request, wherein the publication message includes the message string.

3. The method of claim 1, wherein the first relay is a remote relay.

4. The method of claim 1, wherein the first relay is a central relay.

5. The method of claim 1, wherein receiving, at the first relay, a publication request from a second client comprises receiving the publication request from a second relay in communication with the second client and the first relay.

6. The method of claim 1, wherein the first client is connected to the first relay.

7. The method of claim 1, wherein the target comprises a pattern including a predetermined character string.

8. The method of claim 7, wherein the pattern includes exact text characters.

9. The method of claim 7, wherein the pattern includes metacharacters indicative of rules for describing text characters.

10. The method of claim 1, further comprising:
storing the black list at the first relay; and
ignoring the publication request from the second client if the second client is on the black list.

11. A first relay in a publish/subscribe message system, the first relay is configured to:

receive a subscription request from a first client, wherein the subscription request includes a target;

record subscription information of the first client based on the subscription request;

receive a publication request from a second client, wherein the publication request includes a message string characterized by a pattern;

determine that the second client is not on a black list of clients stored at the first relay;

determine that the target matches at least a portion of the pattern;

determine that the publication request is a local publication request based on a predetermined policy rule, wherein the local publication request is a publication request for one or more clients connected to the first relay, wherein the predetermined policy rule comprises one or more of: designating publication requests from a particular set of one or more clients as local publication requests, or designating publication messages having a specific pattern as local publication requests; and transmit the message string to the first client.

12. The first relay of claim 11, further configured to transmit a publication message from the first relay to a central relay if the publication request is determined to be not a local publication request, wherein the publication message includes the message string.

13. The first relay of claim 11, wherein the first relay acts as a remote relay in the publish/subscribe message system.

14. The first relay of claim 11, wherein the first relay acts as a central relay in the publish/subscribe message system.

15. The first relay of claim 11, further configured to receive the publication request from a second relay in communication with the second client and the first relay.

16. The first relay of claim 11, wherein the first client is connected to the first relay.

17. The first relay of claim 11, wherein the target comprises a pattern including a predetermined character string.

18. The first relay of claim 17, wherein the pattern includes exact text characters.

19. The first relay of claim 17, wherein the pattern includes metacharacters indicative of rules for describing text characters.

20. The first relay of claim 11, further configured to:
store the black list; and
ignore the publication request from the second client if the second client is on the black list.

* * * * *